(12) United States Patent
Daniel et al.

(10) Patent No.: US 7,755,605 B2
(45) Date of Patent: Jul. 13, 2010

(54) SPHERICAL DISPLAY AND CONTROL DEVICE

(76) Inventors: Simon Daniel, Abbotswood, Rowhills, Farnham, Surrey (GB) GU9 9AU; Christopher Wright, 116 Bath Road, Stroud (GB) GL5 3NX; Simon Welland, 107 Knatchbull Road, London (GB) SE5 9QU ( * ) Notice: Subject to any disclaimer, the term of this patent is extended or adjusted under 35 U.S.C. 154(b) by 859 days.

(21) Appl. No.: 11/569,135

(22) PCT Filed: May 13, 2005

(86) PCT No.: PCT/GB2005/001826

§ 371 (c)(1),
(2), (4) Date: Nov. 15, 2006

(87) PCT Pub. No.: WO2005/114624

PCT Pub. Date: Dec. 1, 2005

(65) Prior Publication Data
US 2007/0247439 A1    Oct. 25, 2007

(30) Foreign Application Priority Data
May 18, 2004    (GB) ................. 0411080.5

(51) Int. Cl.
*G09G 5/00* (2006.01)
*G06F 3/041* (2006.01)
(52) U.S. Cl. ............... 345/156; 345/173; 345/6
(58) Field of Classification Search ........ 345/156, 345/173, 6
See application file for complete search history.

(56) References Cited

U.S. PATENT DOCUMENTS

| 1,960,803 | A | 5/1934 | Baumer |
| 4,151,994 | A | 5/1979 | Stalberger |
| 4,656,506 | A | 4/1987 | Ritchey |

(Continued)

FOREIGN PATENT DOCUMENTS

WO    98/14863    4/1998

OTHER PUBLICATIONS

Xie, Huikai and Fedder, Gary K.; Integrated Microelectromechanical Gyroscopes; Journal of Aerospace Engineering © ASCE, Apr. 2003, (pp. 65-75).

(Continued)

*Primary Examiner*—Kevin M Nguyen
(74) *Attorney, Agent, or Firm*—Conley Rose, P.C.

(57) ABSTRACT

A spherical display and control device, that is preferably collapsible between a spherical configuration and a collapsed generally cylindrical ellipsoid configuration, comprising a flexible transparent spherical surface sprung attached to a central hinged modular cube assembly that contains digital displays on outward faces, and circuitry, battery units and electronic modules on inward surfaces, where said sphere surface contains surface position sensing layers and said central cube contains gyroscopic and inertial sensing devices to provide spherical rotation, and physical displacement data for three dimensional control applications, where said displays preferably have curved polarizer lenses such that the overall device appears as a spherical display or are flat to form an overall Cuboid display or are combined with a flexible spherical display surface. The overall device being mechanically biased such that it is Bi-stable between the spherical and collapsed configuration via the action of pulling open and rotating the central cube halves.

38 Claims, 15 Drawing Sheets

U.S. PATENT DOCUMENTS

| | | |
|---|---|---|
| 4,955,841 A | 9/1990 | Pastrano |
| 5,023,725 A | 6/1991 | McCutchen |
| 5,030,100 A | 7/1991 | Hilderman |
| 5,483,261 A * | 1/1996 | Yasutake ............... 345/173 |
| 5,519,809 A | 5/1996 | Husseiny |
| 5,589,828 A | 12/1996 | Armstrong |
| 6,174,097 B1 | 1/2001 | Daniel |
| 6,184,870 B1 | 2/2001 | Bidiville |
| 6,466,200 B1 | 10/2002 | Anton |
| 6,527,555 B1 | 3/2003 | Storm |
| 6,690,355 B2 | 2/2004 | Neuman |
| 6,707,443 B2 | 3/2004 | Bruneau |
| 6,724,366 B2 | 4/2004 | Crawford |
| 6,727,889 B2 | 4/2004 | Shaw |
| 6,731,267 B1 | 5/2004 | Tuoriniemi |
| 6,731,268 B2 | 5/2004 | Anton |
| 6,891,527 B1 * | 5/2005 | Chapman et al. ............ 345/158 |
| 7,082,578 B1 * | 7/2006 | Fishkin et al. ............. 715/863 |
| 7,209,114 B2 * | 4/2007 | Radley-Smith ............ 345/156 |
| 2006/0007222 A1 | 1/2006 | Uy |
| 2007/0106952 A1 | 5/2007 | Matas |

OTHER PUBLICATIONS

International Search Report for Application No. PCT/GB2005/001826, published Apr. 26, 2007, 3 pages.

* cited by examiner

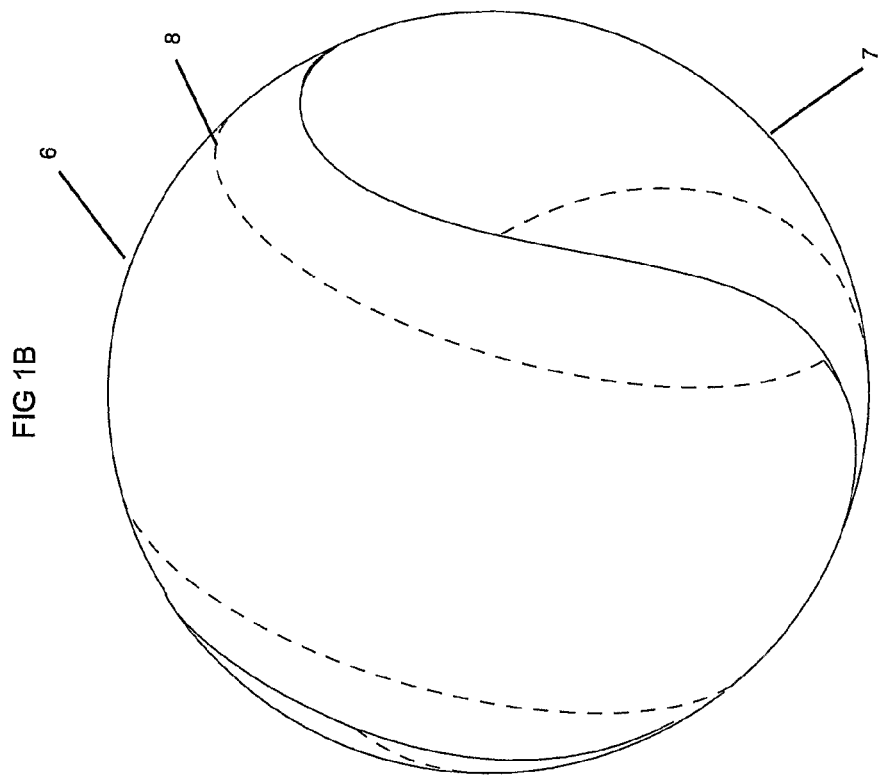
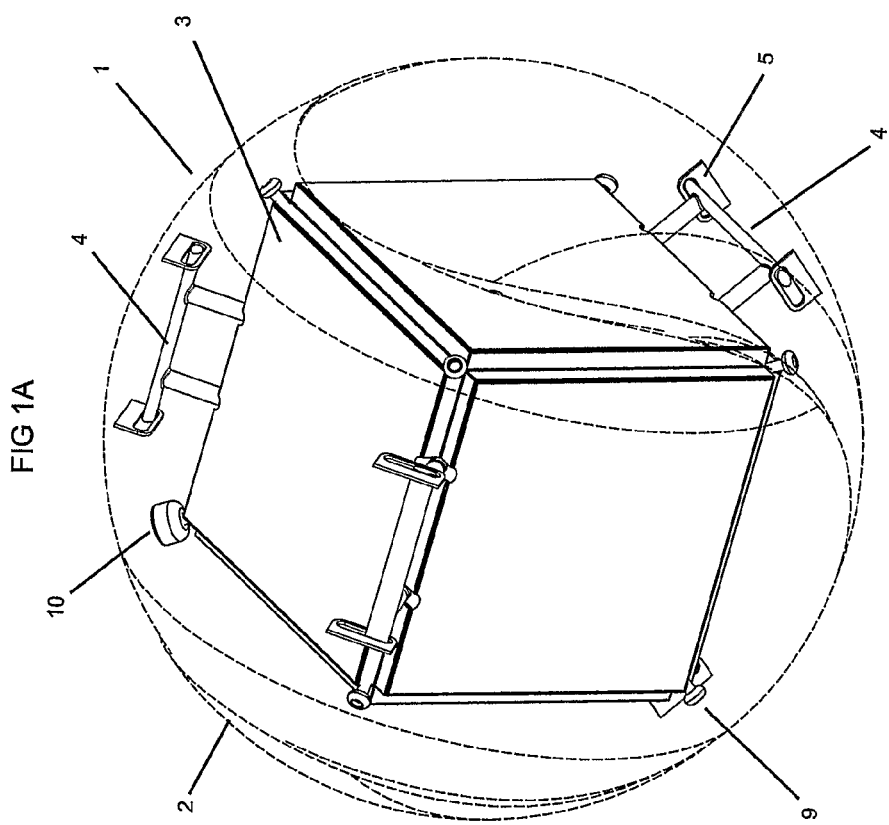

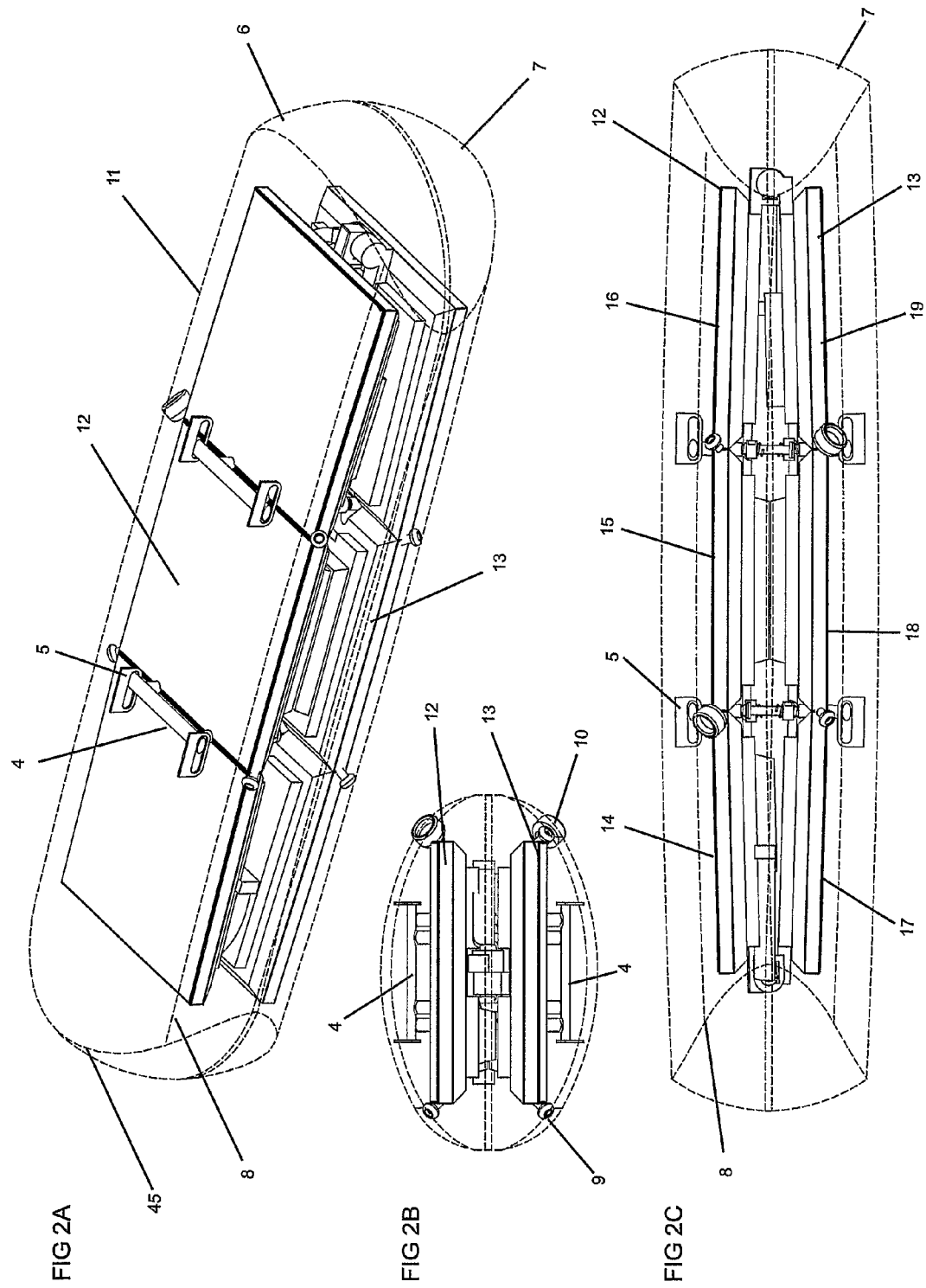

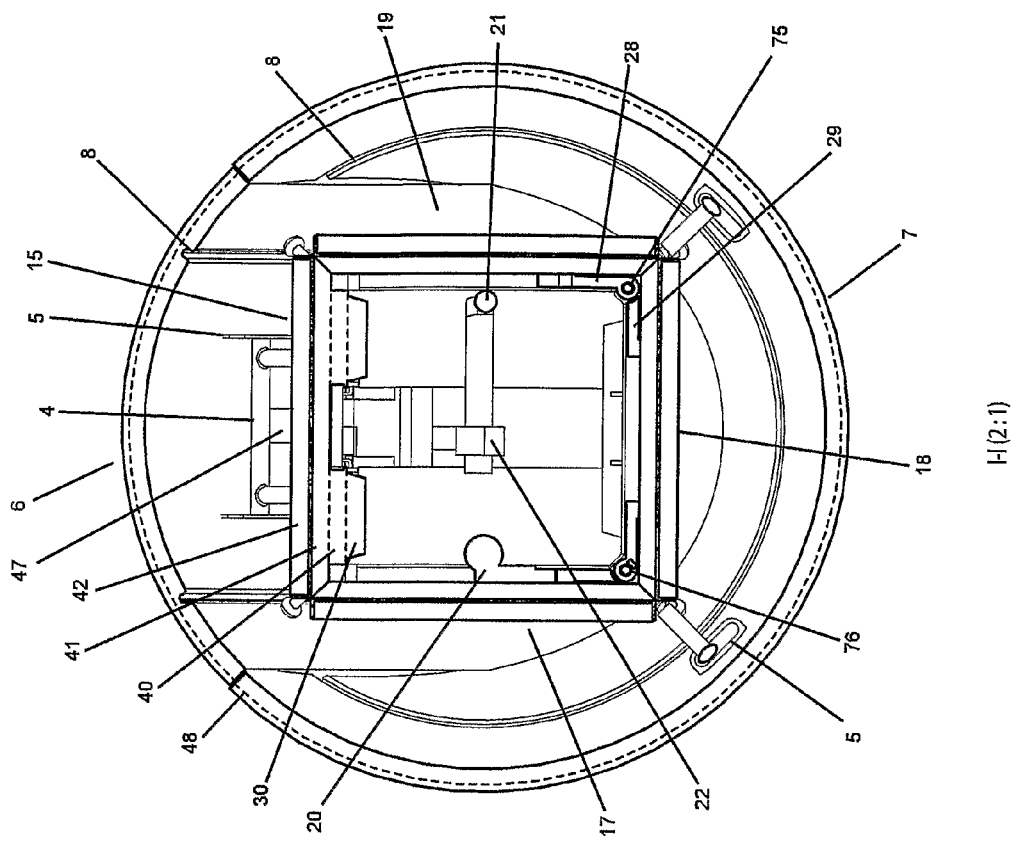
FIG 6
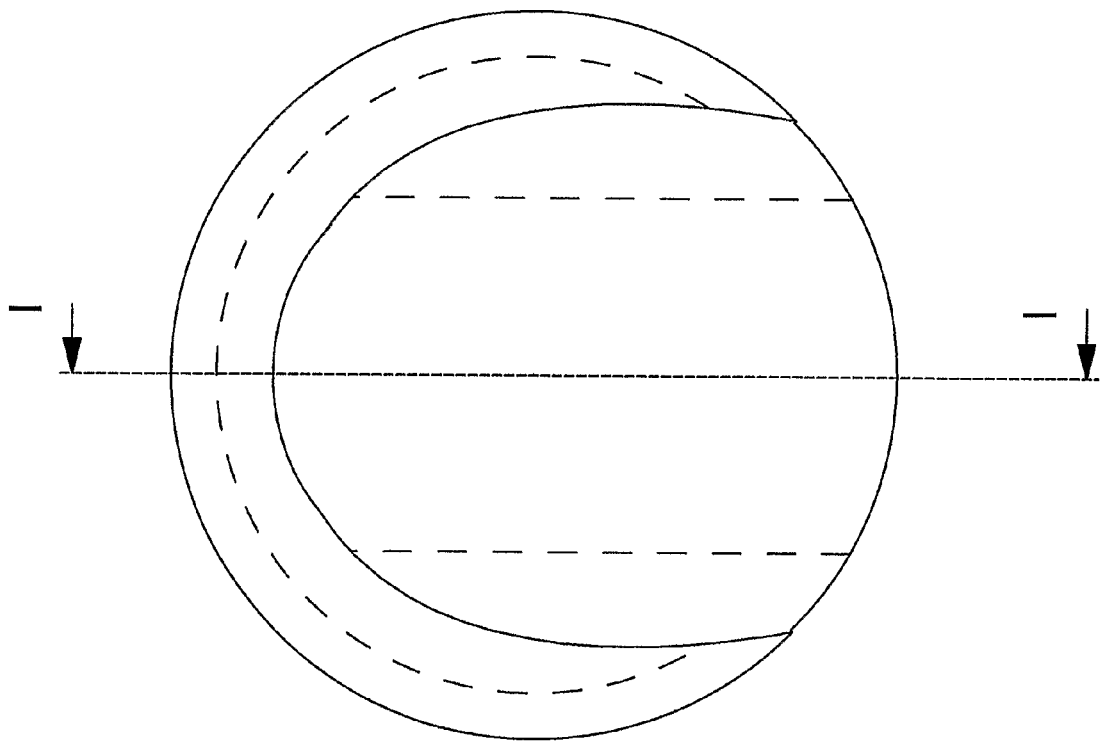

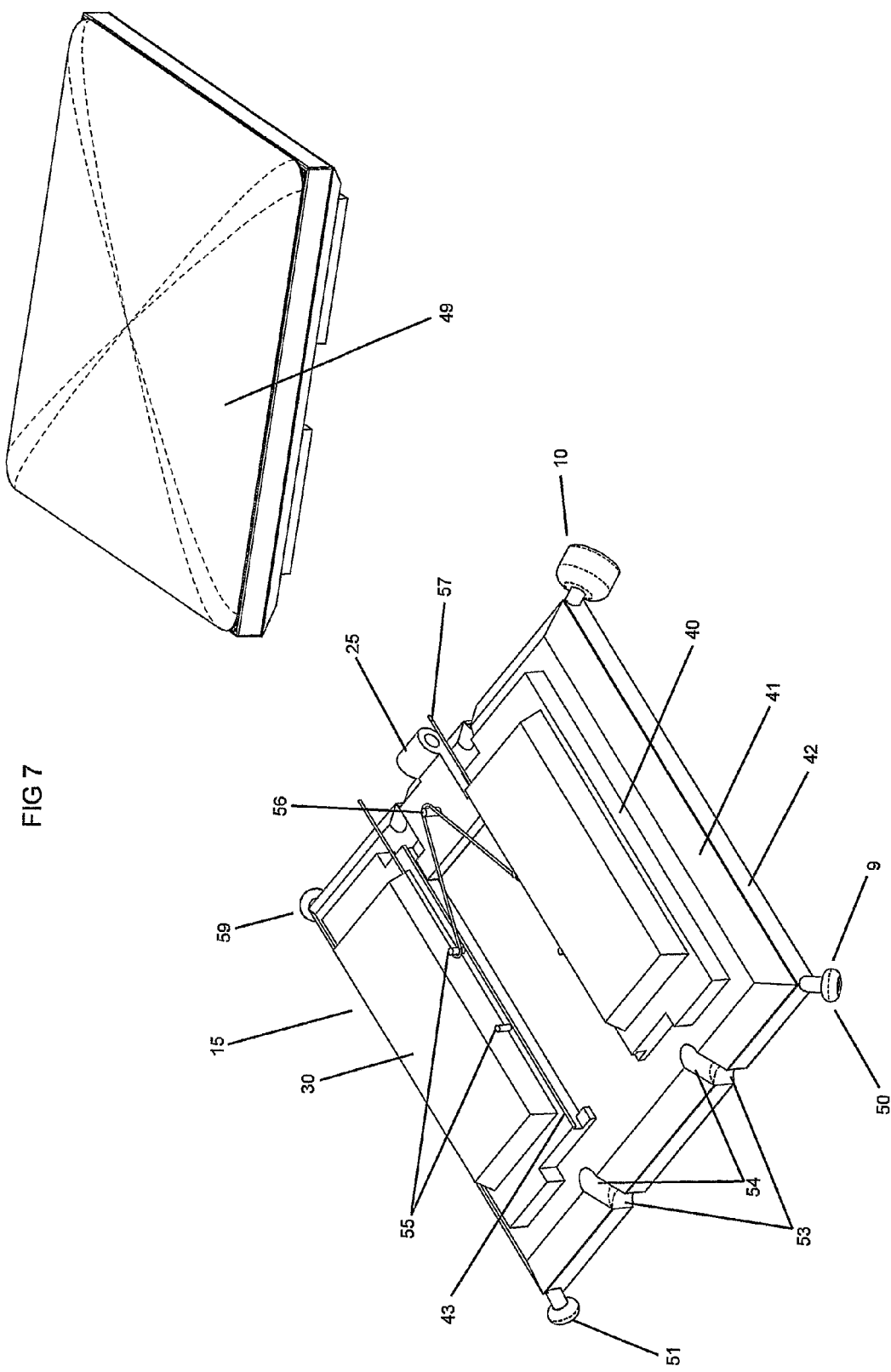

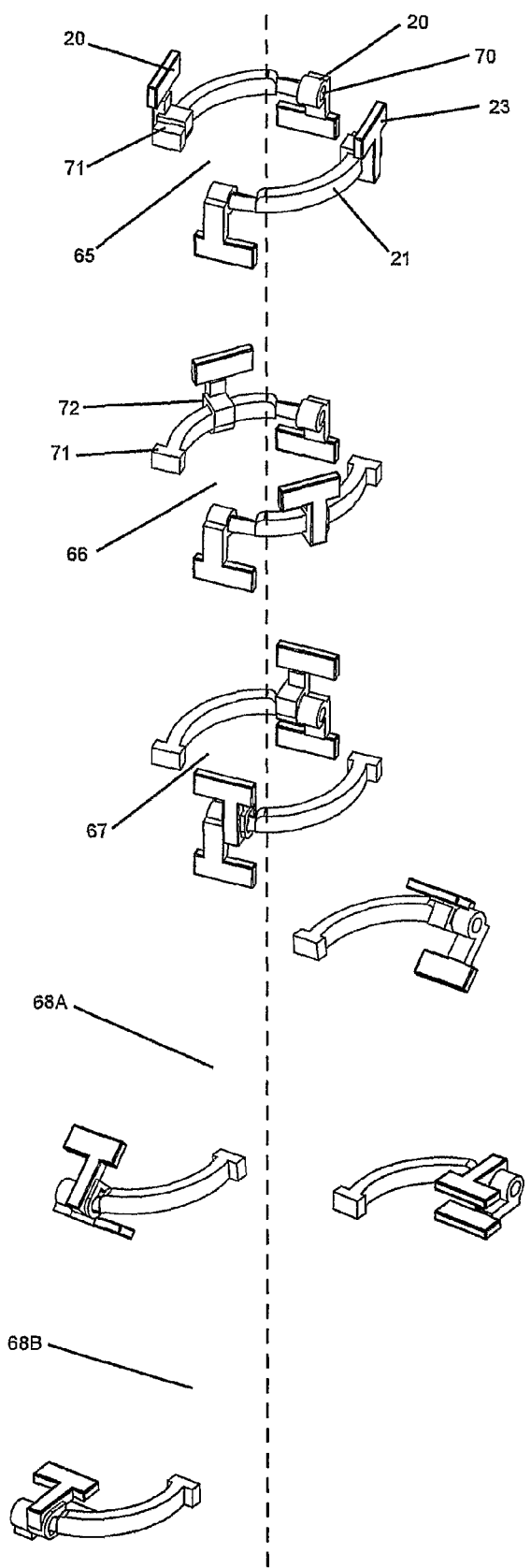

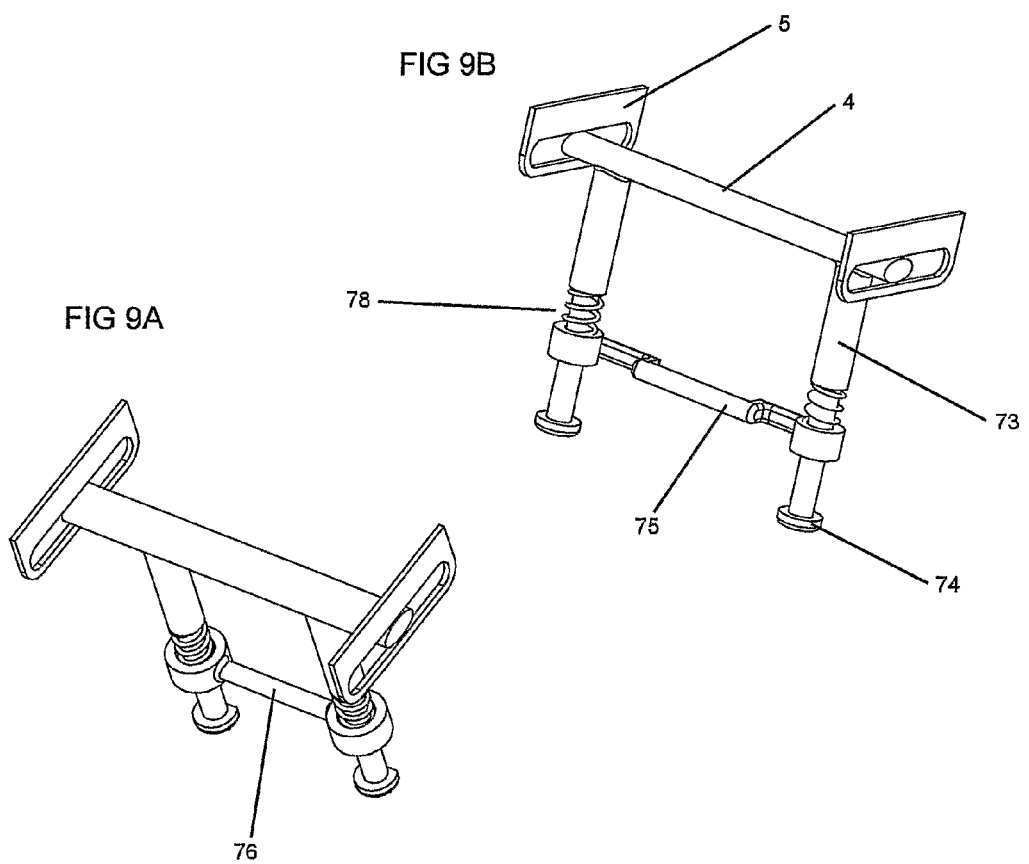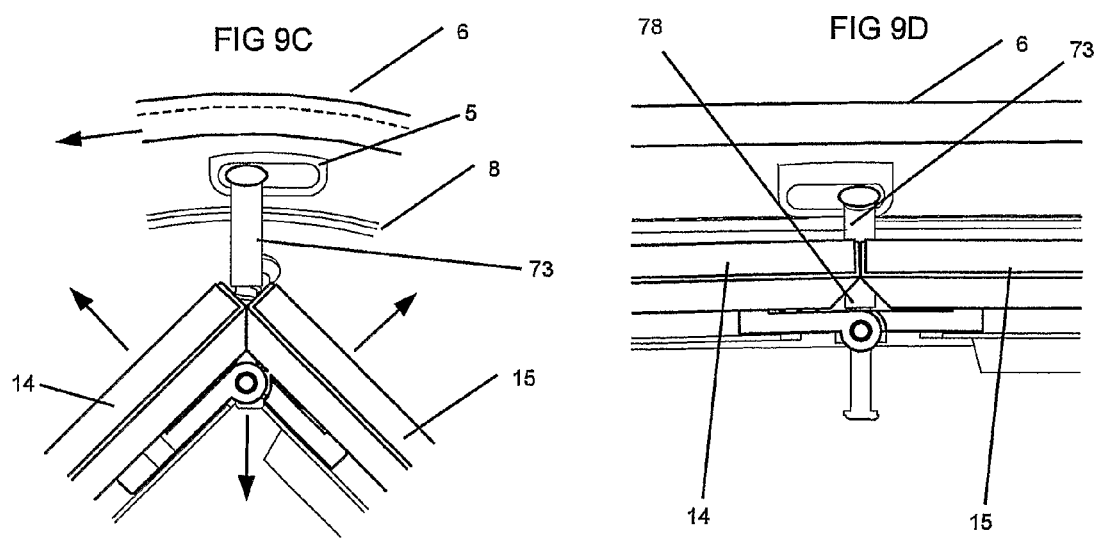

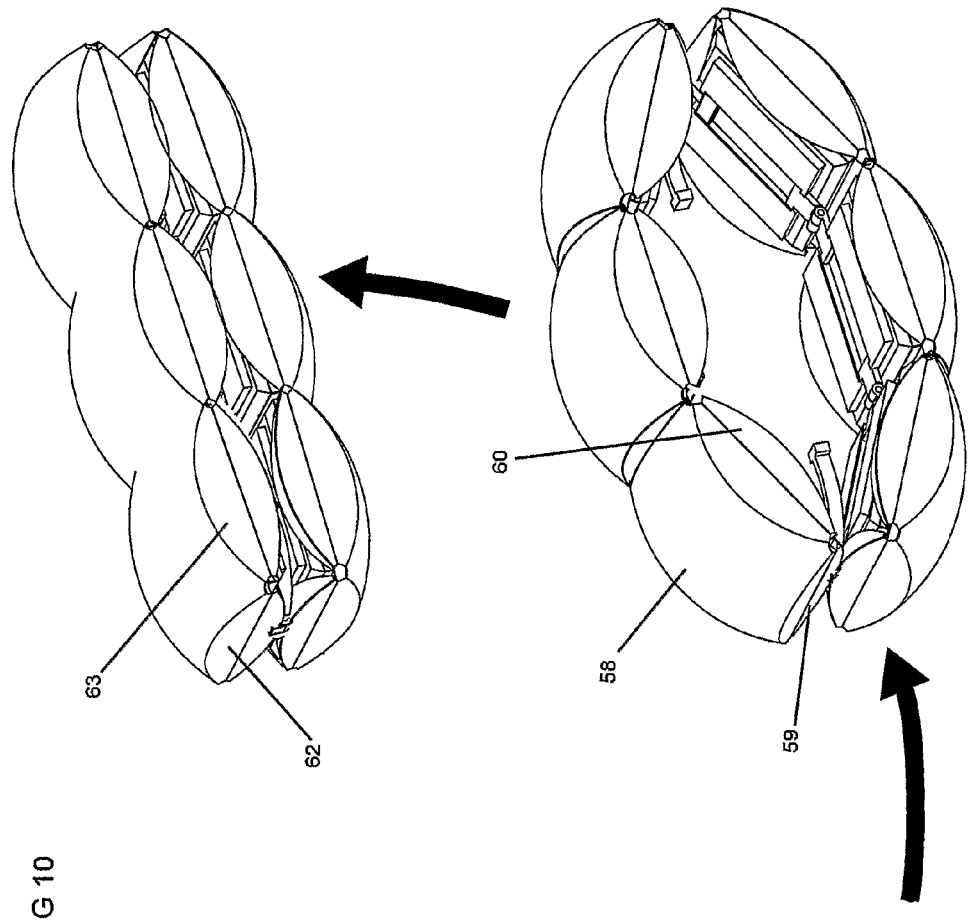
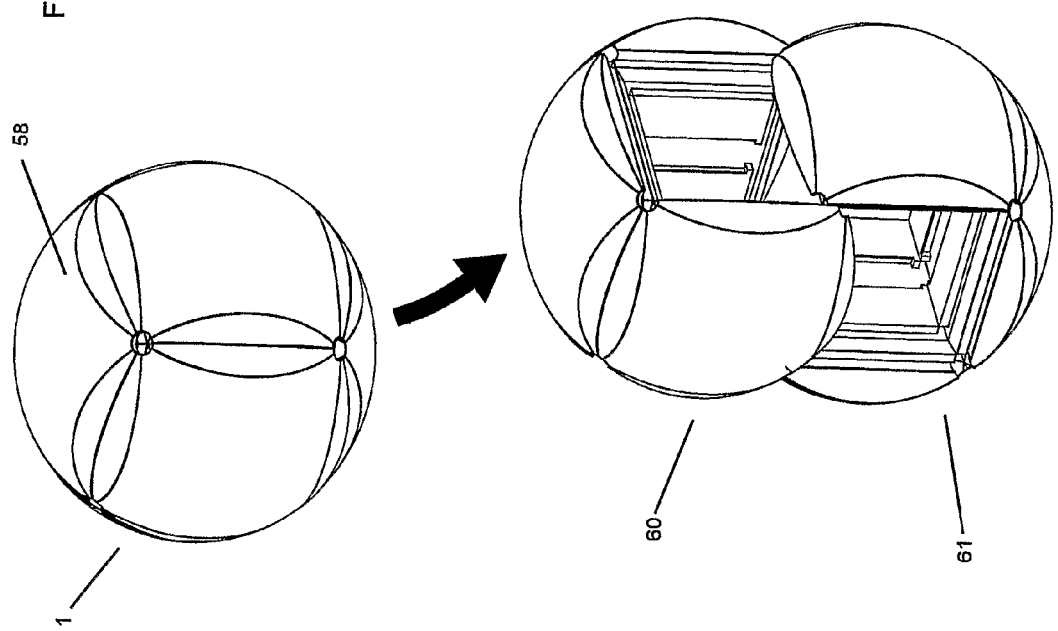
FIG 10

SPHERICAL DISPLAY AND CONTROL DEVICE

CROSS-REFERENCE TO RELATED APPLICATIONS

The present application claims the benefit of priority to PCT/GB2005/001826 filed 13 May 2005, which is hereby incorporated herein by reference in its entirety for all purposes, and claims the benefit of priority to United Kingdom Patent Application No. 0411080.5 filed 18 May 2004, which is also hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1) Field of the Invention

The present invention relates to a spherical display and control device.

This invention in preferred embodiments relates to a collapsible spherical display and control device suitable for 3D mouse control as a computer input device and used as an interactive display for virtual space navigation, alerts and complex information selection or used as a portable interactive spherical display for data, remote application control, interactive games or ornamental purposes.

2) Background of the Invention

The increased complexity of computing and data representation is leading to new forms of data visualization where information can be displayed in 3D, virtual or interactive spaces. Similarly web-navigation systems are emerging where sites and landscapes are displayed as a virtual 3D environment or superimposed onto a real world view. Furthermore desk-top environments are also examining 3D vector-graphic representations (traditionally used in gaming), as a mechanism to help users navigate the increasing amounts of data and applications available, with one approach providing an overall navigation screen that shows all applications/windows that are in-use to help rapid comprehension and selection, however, this has yet to be implemented in a standalone screen or combined directly into a better control device.

Past devices and research on user experience has generally focused on 3D computer input devices used in graphic/engineering design and in gaming, mostly relying on 'Joystick' type devices where a stick or ball is attached to a base. Such devices can be awkward to use at first for 3D navigation, as they are generally used for measuring pressure or displacement change rather than giving feedback cues on current position/context. Alternative approaches have included using physical user position via 'Virtual-reality' gloves or sensors on the body, however, evidence has suggested that users have a reluctance for large scale motion (such as moving an arm or waving) in practical applications. There is therefore a growing need for new forms of 3D input devices that are more easy to use by consumers and provide better visual cues and context to help 3D control and navigation.

A further development is the convergence across a range of computing devices from desktop/workstations, to home TV/game entertainment systems, portable computers, Personal digital assistants and mobile phones. With the rapid miniaturization of the underlying technology many of these devices converge, with the remaining consumer values being device usability, form factor and the portability of input and output devices. Consumers will increasingly prefer input devices to be personal and portable and usable in a wider context, particularly in an office environment, to say be able to select a nearby workstation/conference room screen/device and 'take over' and personalize it to their standard environments, as well as an ability to use a device in a stand-alone private mode or to provide overall context information or information alerts. As with folding keyboards, phones and laptops there is an increased need for such display and control devices to be collapsible from one deployed form to a more compact form and to be easily usable in either a hand or on a surface.

There is substantial prior art relating to 2D input devices and some recent examples of 3D computer input devices. These are generally used as computer peripherals with a workstation, either connected via fixed wire or wireless to the workstation and either mounted directly onto the computing device rather than be usable as a separate generic accessory. The majority of 3D input devices rely on being physically attached to a base unit (e.g. U.S. Pat. No. 5,589,828 by Armstrong which also discloses tactile vibration feedback), using a mechanism like a Joy-stick, or tilt or track ball, or by part enclosing a movable sphere against sprung sensor bearings (as in a normal 2D mouse). Further examples include U.S. Pat. No. 6,184,870 by Bidiville, U.S. Pat. No. 6,707,443 by Bruneau, U.S. Pat. No. 6,727,889 by Shaw). Recent 3D sensor approaches (e.g. U.S. Pat. No. 6,731,268, U.S. Pat. No. 6,466,200 by Anton et al) disclose using specific implementations of acceleration gyroscopes to enable a device to be moved in physical space to provide 3D movement data. Similar examples are emerging for portable devices such as mobile phones to be used as 'magic wands' or with thumb pads and sensor bars (e.g. U.S. Pat. No. 6,731,267 by Tuoriniemi, U.S. Pat. No. 6,724,366 by Crawford, U.S. Pat. No. 6,690,355 by Neuman), or as selector devices to measure physical movement of gestures. Few examples have been found where touch-sensitive layers (such as resistive or capacitance) have been deployed on specific devices with non-flat cylindrical of spherical surfaces other than traditional glove haptic sensors, which generally detect pressure/stretching of a material using a piezoelectric mechanism.

The prior art relating to 3D spherical projection systems and displays generally relates to different mechanisms of forming large-scale projection systems such as might be used for entertainment or gaming/training systems (e.g. U.S. Pat. No. 4,656,506 by Ritchey) or smaller scale display globes. Frequently these describe programmable devices for digital globes for displaying geographic data (e.g. U.S. Pat. No. 5,030,100 by Hilderman with a plurality of optical fibres to spherical surface, U.S. Pat. No. 5,519,809 by Husseiny et al, U.S. Pat. No. 5,023,725 by McCutchen, which discloses an internal decahedron arrangement of projection surfaces, U.S. Pat. No. 6,527,555 by Storm which discloses the general concept of a programmable globe based on a plurality of displays, arranged as malleable or cubic displays). However, none of the prior art examined relates to spherical displays used as control devices or any that are designed to be portable or collapsible and used as an accessory computer input device rather than output projection display.

Few examples of prior art covering collapsible spheres have been found, other than general art on inflatable balls. Of note is U.S. Pat. No. 4,151,994 by Stalberger 1979, which describes the typical 'dog-bone' or 'generally figure-eight' shaped ellipsoid flexible surfaces that are sewn together to form a typical ball, as would be found in a baseball or tennis ball (e.g. U.S. Pat. No. 1,960,803, by Baumer 1930).

Examples of collapsible electronic devices have been demonstrated for instances of portable phone devices, flat screen devices, and collapsible keyboards in general (e.g. U.S. Pat. No. 6,174,097 by Daniel).

None of the prior art examined address the considerable user and control benefits for a control device having visual cues and feedback via a display surface to support overall 3 dimensional navigation and 3D axis control, nor the benefits of having a dynamic interactive touch sensitive spherical display surface, nor the complex mechanics and holistic design required to make such a device portable and collapsible in a preferred embodiment between convenient configurations.

To the best of the applicant's knowledge, the prior art, whilst suggesting some features and numerous variations of input devices or spherical displays in general, the prior art has not disclosed some of the highly advantageous features of the present invention discussed herein.

SUMMARY OF THE INVENTION

According to a first aspect of the present invention there is a provided a spherical display and control device comprising a transparent flexible outer shell containing transparent internal layers used for surface touch-screen sensing, a central assembly that mechanically supports said outer shell in a spherical configuration, with said central assembly supporting electrical components that provide motion and rotation sensors suitable for control and data input purposes, and said central assembly containing a plurality of electrical components for acting to provide battery power, display and control circuitry, connectivity, data storage and sound input and output, and at least one display electrically connected to said central assembly, the display being arranged as at least one flat panel supported by said assembly or as at least one flexible thin-film display attached to the sphere shell.

According to a second aspect of the present invention this is provided a spherical display and control device comprising a transparent flexible generally spherical outer shell containing largely transparent internal layers used for surface touch-screen sensing, a modular central assembly that mechanically supports said outer shell in a spherical configuration and having a plurality of faces in a polyhedral arrangement that are mechanically and electrically connected, with said central assembly supporting electrical components that provide gyroscopic and acceleration sensors suitable for control and data input purposes, and with said central assembly containing a plurality of electrical components that could act to provide battery power, display and control circuitry, connectivity, data storage and sound input and output, and a plurality of thin displays electrically connected to said plurality of faces forming the central assembly arranged as flat panels supported by said faces or as a flexible thin-film displays attached to the sphere shell.

According to a third aspect of the present invention there is provided in a preferred embodiment a collapsible spherical display and control device suitable for providing 2D mouse and customised 3D control of suitable applications on a nearby computing device, with visual feedback showing current context, options or overall 3D position by representing the 3D or information space dynamically on the surface of the sphere, such that the device can be used as a navigator/selector for controlling and accessing data and applications. The device can also be used in a stand-alone mode as an information ball, general portable display, to display status alerts or aid communication, and for interactive games. The device is preferably collapsible between a spherical configuration and a collapsed generally cylindrical ellipsoid configuration that has greater portability and provides a larger flat wide screen form factor. Both forms are preferably used in the palm of a hand, on a surface or in a docking cradle.

The overall spherical display and control device preferably comprising of a flexible transparent spherical surface which is sprung attached to a central hinged modular cube assembly that contains digital displays on outward faces, and circuitry, battery units and electronic modules on inward surfaces, where said sphere surface is formed from two inter-locking 'dog-bone ellipsoid' shaped sections, preferably with magnetic edges, and contains surface multi-position sensing layers, with said central cube assembly containing gyroscopic and inertial sensing devices to provide 6-degree data covering spherical rotation, and physical displacement data for three dimensional control applications, where said cube displays are preferably thin-film with polarizer and is preferably combined with a fresnel lens or curved lens optics such that the overall device appears as a spherical display or when flat forms an overall Cuboid display. Said spherical display could also be formed from a flexible OLED (Organic Light Emitting Display) or transparent polymer material attached directly to the inside of the spherical surface with the outward cube faces used to support additional electronics and components. Said cube assembly being formed from two sliding interlocking half cubes arranged at right angles with each containing 3 hinged cube faces and being joined to each other by means of central rotary cube hinges that enable the two half cubes to be mechanically slid apart, rotated and collapsed. The overall device being mechanically biased such that it is Bi-stable between the spherical and collapsed configurations via the action of pulling open and rotating the central cube halves. Said cube halves having slidable off-axis corner hinges, which secure a sprung sphere bar assembly that affixes to sliding grooves in the spherical surface such that it both fastens the outer sphere section to the central cube assembly as well as provide some flexibility in the overall sphere device to dampen vibration of the central cube assembly from external knocks (or to enable the device to be bounced), and is biased to help pull the sphere surface closer towards the cube assembly when the overall device is collapsed.

Said overall device preferably supporting a wireless communication module on the inside of the cube-assembly which could communicate with nearby devices, or a dedicated docking cradle linked to a workstation. Said cube-assembly also having sprung corner pegs, which could optionally provide additional support and control for the sphere surface, and could be used for specific corner devices such as a microphone, speaker, LED indicator, environment sensor, or for additional control buttons on the surface of the sphere. One corner peg being larger and acting as a docking point, either as a socket or sprung peg, that would be used as a physical connector to a docking station, preferably using the USB standard involving four connectors to support data linkage and power contact for recharging. Said corner peg could also have a larger physical mass to bias the sphere orientation.

Said sphere surface in a preferred embodiment uses a transparent capacitive sensing technology that uses several transparent conductive layers of sensors (typically formed from say indium tin oxide (ITO)) sealed in adhesive and usually sandwiched between a transparent layer such as polyester, to detect changes in capacitance on the surface caused by positioning or moving a finger. Preferably this is configured as a multi-position sensor to detect 'topology' changes in the overall capacitance field surrounding the sphere surface, such that it can distinguish between slow moving changes (caused by the hand and fingers holding the sphere) vs faster movements caused by sliding a finger over the surface or clicking or tapping the surface. Said slow moving changes generally forming 'capacitance field signatures' that can be identified to recognize how said Sphere device is being held in a hand providing an option of dynamically rotating the sphere display or optionally providing custom dynamic button zones adjacent to fingers. Said multi-point sensing uses at least two zones, one on each of the two sphere sections, and could be further segmenting into smaller areas that perform single-point sensing (e.g. at the resolution of a finger), or simpler multi-point sense resolutions. Alternatively the touch surface could be segmented into an 'active area' used for finger sensing and a 'passive area' identified by combining location of 'slowing moving' capacitance changes corresponding to where the hand/palm holds the device with overall sphere orientation information obtained via gyroscopes. In the collapsed configuration the top section could be similarly assigned to be the 'Active sensing area' suitable for interactive selection or x/y control of a nearby device, with the bottom surface resting in the palm or on a table to be 'passive'.

The overall touch surface thereby enables a user to perform 2D or X/Y mouse control of a nearby application—simply by sliding a finger over the surface of the sphere, alternatively in 3D navigate mode, this sliding action could rotate or spin a 3D surface with corresponding movement of the displayed spherical image on the sphere, e.g. a globe, information surface or navigation page. Optionally an area of the sphere could be dedicated for x,y movement and another area for alternative control by visually segmenting the sphere into zones using colours or borders, such that the overall sphere device could be customized to a specific type of control, as might be useful in a complex engineering package or game/puzzle, or as part of a complex interactive visualization, which by way of example could have an area for zooming in/out, an area for moving, an area for rotation and an area for application functions. Similarly, the sphere surface could show information which could be dynamically selected, e.g. arranged as a globe of news information which could be rotating and enable clicking on countries, zooming in and selecting specific news information by means of a similar virtual map representation. Alternative technologies for touch-screen action include resistive layers, piezo layers, or optical sensors or could directly use a fixed finger cell resolution grid of button membrane sensors on the sphere surface (as in a large vertices polyhedral such as a Buckminster Ball).

Said overall spherical display and control device also preferably containing gyroscope and inertial module sensors to provide 6 degree position data information, 3 of angular momentum to identify rotations or spins of the sphere, and 3 of lateral motion, to identify major lateral movement of the sphere, such that it could be used in the hand to raise/lower objects within an application, or to move the view axis/position in a scaled relationship to physical movement of the sphere. The benefit being the option of combining this with the touch-screen action of the sphere which could be used to 'activate' moving an object in an application when a virtual button is shown on the sphere and selected via the touch-screen, or to control speed/scale in a similar fashion. Said gyroscope preferably being solid-state, which by way of example could be formed from a series of piezoelectric vibrating elements (vibrating resonators) which utilize a secondary vibration in an direction orthogonal to the original rotation caused by the Corioli's effect enabling measurement of the rate of rotation. Said gyroscopes are of low cost and have accuracies capable of measuring small degree rotations.

By way of example Murata currently market a small (12×7×2.6 mm) solid state gyroscope, traditionally deployed in automotive applications and increasingly in consumer electronics such as video cameras, that could easily be accommodated within the module space on the reverse of the cube assembly. Similarly integrated MEMS gyroscopes (Microelectromechanical systems) are emerging to provide greater accuracy and formed as thin-film structures at ever lower costs, and suitable for small consumer devices (e.g. Integrated Microelectromechanical Gyroscopes by Huikai Xie and Gary Fedder, Journal of Aerospace Engineering, April 2003/pg 65-75).

A major overall benefit of the spherical display and control device is the control power obtained through the combination of multi-point surface sensing technology, rotation sensing, lateral movement detection with customisation of the spherical display to either show specific control zones, or show a representation of position in a 3D space (e.g. a virtual globe map), or to show position and selection options on a spherical information surface (e.g. a geographic map of data arranged in a 'heat-map' where area shows importance, colour—category), or allow dynamic selection to access information or pop it open on a nearby device, or to act to show a current navigation map (e.g. data folders or a running representation of all windows/applications open on a desktop) for fast navigation and selection).

Additional control possibilities are provided by integrating a microphone and speaker into the device that could be used to interpret voice commands (either via onboard circuitry and storage) or by wirelessly connecting to a local voice recognition application on a nearby server, or for direct voice recognition to aid recording notes or entering text via the device, as well as support sounds and voice messages or telephony via the device.

Of particular benefit is where the device is used as an information navigator, to say show primary category organization of say six classes of information, and enable drill down through selection of a class to show 'fractal-like' sub-classes arranged around the sphere, and enable rapid drill-down and selection. Such a spherical representation and selection could be applied to manage folders of information, or to manage links (such as web favourites), so that a vast amount of information was easily accessible visually and by touch action. This is of increasing importance as modern consumers rely on managing vast quantities of information, much of which is external links or access points. Said device would therefore act as an information ball providing the user with a dynamic 'crystal ball' access device to the web, their personal data storage or to external data banks. Said information navigator could be mirrored wirelessly with a software animated 3D image of the sphere on a nearby workstation screen or application, which would dynamically reflect the current orientation and surface display to further aid navigation, and also provide a means for a user to choose to control aspects of the sphere from the workstation. Said software sphere might also become a useful direct form of control device using the same metaphor and principles, due to the increased comfort of users accessing information by means of spherical representations.

Another benefit is where the device is configured as a control or status dashboard that could be set to provide a visual status in each zone of different activities (e.g. say one zone relating to work, emails/actions, and another zone targeted on friends or family) to provide a rapid mechanism for the user to see what is happening in many zones, without having to directly interrupt their current activity. In the collapsed form, the device would show screens on each side, and could be used during a meeting to monitor external activities/information.

Of particular relevance is where this is deployed in a team environment, with say each face (in the cube), or sub area of the sphere, allocated to a particular view of progress/team activity, or configured to represent each team member, such that instant problems, progress, issues are visible on the sphere, which could be dynamic and live. This could act either as a team status ball, or dynamic communicator ball, such that clicking on a zone, instantly triggers the equivalent zone on that team members ball to flash, and could facilitate two-way communication by virtue of an inbuilt microphone/speaker and the overall wireless connectivity. Similarly a ball could be configured to represent different members of the family or kids, such that one could have constant awareness of their location, activity and provides an ability to rapidly communicate.

A further benefit is where many people in a company use the same device and have common applications installed, such that a person could walk around with their 'team ball' which would be wirelessly or asynchronously connected to other balls and workstations, such that proximity of a person could be identified via an icon pop-up on a workstation, and said person could be allowed to 'take over' a workstation screen temporally for purposes of demonstrating/instructing or to bring up a personal and custom view to provide rapid access to a personal piece of content or application. Such an application is likely to create new forms of working and collaboration.

Another benefit is through the portability of the device, such that a consumer might preferably use the device at a workstation to control their applications, or provide an overall navigator, or general alert dashboard for areas of interest, and then take the device to meetings—for the purposes of data access and alerts (e.g. email monitoring/team activity), or during transport, or take the device home where it could act as a generalized remote for home applications, and provide a reduced alert window for urgent work related activity. Of particular relevance is the ability of such a display to be configured to provide passive alerts through visual representation with defined preferences and filters, such that small changes/alerts are happening routinely and visually but do not interrupt the users current activity unless above a certain threshold.

Key benefits of the overall spherical display and control device in the collapsed configuration are that it provides a more compact, portable format suitable for carrying in a pocket, using flat in a hand or vertically as in a remote control, or resting on a flat surface. Of particular relevance is the provision of a wide screen on each side comprising the 3 cube face displays arranged in a row, which could be used for document or web page viewing, and again supports touch-screen surface control, such movement could provide X/Y input to a nearby device or control and move information displayed on the device.

Said device therefore provides a variety of applications—being either a customisable control device, or information navigator, alert or dashboard ball, team ball, communicator ball, or generalized portable display/alert and control system.

Of particular note is that the overall spherical display and control device could be used for interactive games as a 'game ball', either as part of another application, or with dedicated games in a stand-alone fashion. By way of example software on the device could enable games such as 'follow me' where different parts of the ball illuminate and require touching in a sequence, musical games in either the spherical or collapsed configuration (e.g. musical keys visually shown or using touch and slide action to create notes), puzzle games (e.g. like a Rubik cube) where a physical puzzle/pattern is shown on the surface and requires rotation (or physical hand sliding) to move pieces, tennis/pong games—where a central screen shows a game area and separate areas on the device are used for control keys, or likewise any other simple game requiring a display and side keys. Of particular note is the scope for new custom games utilizing both the spherical touch-screen and rotation aspects, such as a 3D Tetrus style game where physical rotation is used to change direction of falling widgets. Further complex games could use lateral movement detection, from measuring and reporting accuracy of say dance, exercise or yoga positions through to games requiring physical movements on demand. A variety of mechanisms exist where the device when not used for navigation, information or work related activities could provide stress relief and executive toy usage.

Said overall spherical display and control device could be combined with a docking station, either attached to a workstation or used in isolation, for the purpose of recharging and data connectivity, and preferably to provide a local wireless contact point. Said cradle preferably has a small paper printer which would be usable for quick prints of lists/notes triggered from the sphere.

The sphere shell could in a further embodiment be achieved in a solid transparent rubber form by attaching a suitable section directly to the cube faces and be collapsible via the same central cube assembly and hinging mechanisms. In an alternative embodiment the sphere could also be combined with a mechanical outer wheel as an alternative to transparent capacitance technology that would slide within a grooved recess at the 'equator' of the device and provide rotation and selection data. A further embodiment would be to shape the end of a sphere shells such that it could hinge or fold up to provide greater space for accessing a docking point or connectors within the device and could preferably be formed to provide a stylised representation of say an 'Apple'.

BRIEF DESCRIPTION OF THE DRAWINGS

The accompanying drawings illustrate presently preferred embodiments of the present invention and together with the detailed description serve to explain the principles of the present invention.

FIG. 1A shows a three dimensional view of the overall spherical display and control device in its spherical configuration showing a transparent sphere and internal display and modules cube. FIG. 1B shows the outer surface profile of the device.

FIG. 2A shows a three dimensional view of the overall spherical display and control device in its collapsed configuration showing a long ellipsoid with 3 lateral display screens on adjacent sides. FIG. 2B shows an end profile and FIG. 2C the side profile through the collapsed device.

FIG. 6 shows a cross-sectional view through the centre of the overall spherical display device.

FIG. 7 shows three dimensional view of the front and reverse of a cube panel used to form the interior cube assembly showing the sliding hinge mechanism FIG. 8 shows three dimensional intermediary views of the central collapsible rotary hinge mechanism that joins the two half-cube assemblies together FIGS. 9A and 9B show three dimensional views of the sphere support bar assembly in the spherical configuration. FIG. 9C shows a corner view of the sphere support bar assembly in the spherical configuration and FIG. 9D shows the bar assembly in the collapsed configuration FIG. 10 shows a three dimensional view of a further embodiment of the overall spherical display and control device where the outer sphere section is formed from solid sphere sections attached directly to the cube faces, arranged in a spherical configuration and intermediary stages to the collapsed configuration.

DETAILED DESCRIPTION OF THE INVENTION

Figure 3:
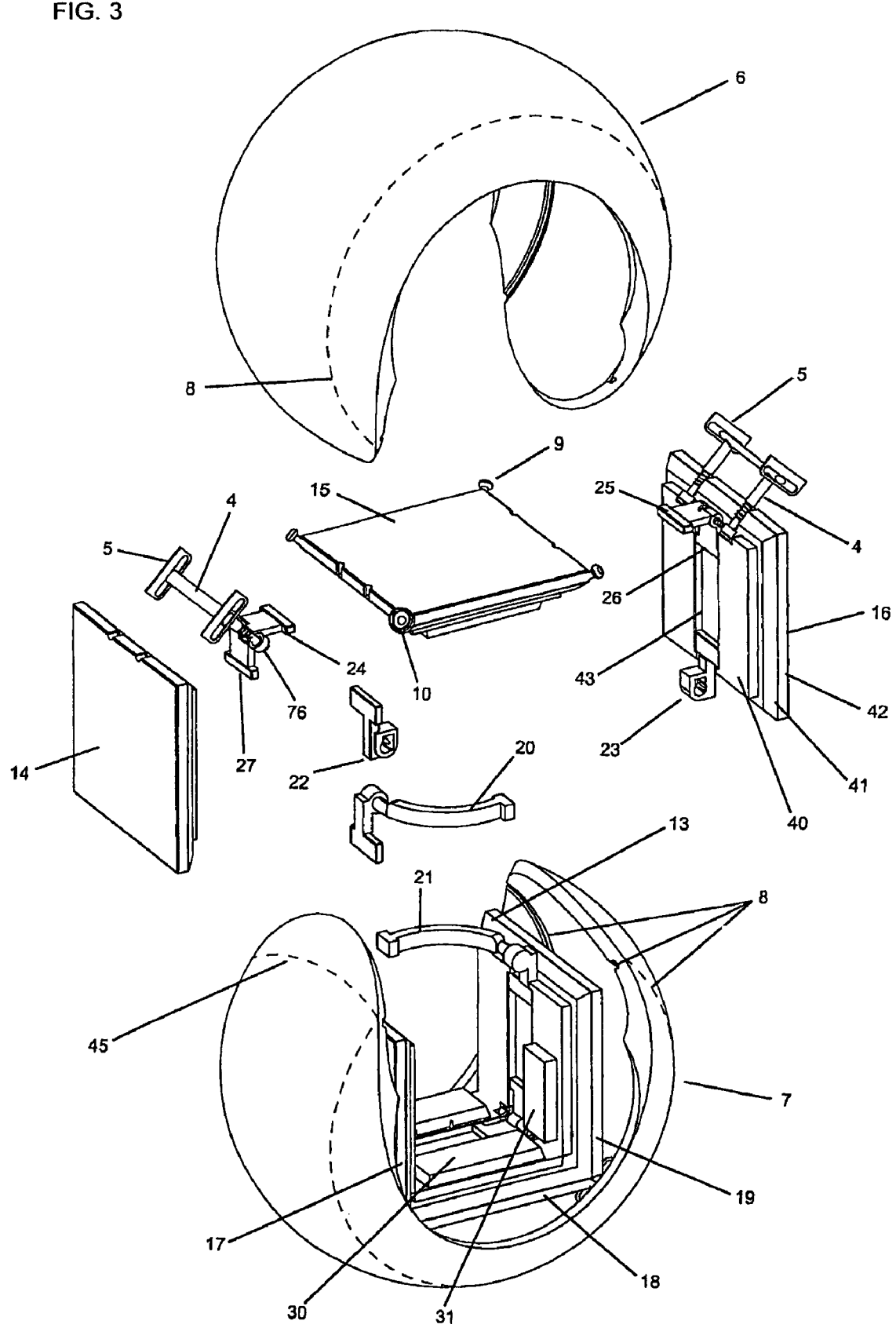
FIG. 3 shows a three dimensional view of the overall spherical display and control device where one half of the sphere assembly is shown in an exploded form to illustrate key components of the device.

A preferred embodiment of the invention will now be described in detail with reference to the accompanying drawings herein:

First Embodiment

Referring to FIG. 1A, which shows a 3-dimensional profile of an overall spherical display and control device 1 in its spherical configuration which comprises a flexible transparent sphere shell 2 affixed to a central cube assembly 3 by means of sprung support bar assemblies 4 sliding within grooves 5 attached to the interior surface of the sphere 2. At the corners of the central cube assembly 3 are pegs 9 and an external connector socket 10. FIG. 1B shows the external profile of the overall sphere 2 which is formed from two interlocking identical flexible 'dog bone' shaped curved sections 6 and 7 each containing grooved recesses 8 on their underside to facilitate folding. The edges 44 (FIG. 5) of sections 6 and 7 are preferably magnetic either as a magnetic strip attached along said edges or in particle form embedded within the transparent sphere shell edge, such that the two surfaces interlock together as a sphere both mechanically from the biasing action of the elastic flexible surface and magnetically at the edges.

Referring now to FIG. 2A, which shows a 3-dimensional profile of the overall spherical display and control device in its collapsed preferably cylindrical ellipsoid configuration 11. FIG. 2B shows the end elevation and FIG. 2C a side elevation.

The overall device comprising the collapsed central cube assembly 3 which can be seen to be formed from two interlocking half-cubes 12 and 13, each supporting three hinged cube facades, facades 14, 15, 16 on the upper half-cube 12, and facades 17, 18, 19 on the lower half cube 13. The two half-cubes 12 and 13 being rotationally hinged together as will be illustrated in FIG. 5 and FIG. 8, and affixing by means of the sphere support bar assemblies 4 the flexible outer surfaces formed by uncurling the curved outer sphere shells 6 and 7. Said sprung assemblies 4 shorten and act to mechanically pull the curved shells 6 and 7 closer to the collapsed cube assembly 12 and 13 (See FIG. 9). Again the edges 44 serve to help fasten the edges of shells 6 and 7 together in the collapsed configuration 11. The grooved recesses 8, 45 on the underside of shells 6 and 7 facilitate the elastically biased fold down of the shell edges so that they encase the device in the fully collapsed configuration, Said elastic bias in the shells is facilitated by a combination of said grooved recesses, the mechanical action of the springs within the cube assemblies 12, 13 and sphere support bar assemblies 4, and by the natural bi-stable states of the curved sphere shells 6 and 7 (aided by the elastic composition of the shell material and optionally integral fibres having different tensile and compressive strengths). The overall effect is that the spherical form 1 and collapsed form 11 are preferably stable with intermediary points mechanically biased to alternate forms.

Referring now to FIG. 3 which shows a three dimensional view of the overall spherical display and control device where one half of the sphere assembly—half cube 12 is shown in an exploded form to illustrate key components of the device. This more clearly shows that a half-cube 12 is formed from three pivotally connected cube faces 14, 15 and 16, containing slide rails 43 on their underside to enable lateral sliding of cube hinges 24, 25, 26, 27 and central cube-halve rotary joining hinges 20, 21 and 22,23. Said pairs of sliding cube hinges 24, 27 and 25, 26 allow the folding axis between pairs of cube faces to be offset from the diagonal underside cube face edge, and lie directly below the outward cube face edge 42 (also See FIG. 9D), thus enabling the hinge mechanism to be physically larger without encroaching on the size of the screen 42 on the outward cube face, and enabling the edges of said screens 42 to be flush at the corners in the cube assembly 3, 12 and 13. Furthermore, said sliding cube hinge mechanism enables the corner axis between cube faces to be used to support the sprung screen support bar assembly 4 as will be illustrated in FIG. 9. Biasing action by means of springs (not shown) would be used to mechanically preference hinges 24,27 and 25,26 generally away from the folding axis towards the centre of the cube face slide rails 43, such that the overall cube assemblies 12, 13 have a preference towards maintaining a cube assembly (where cube faces are perpendicular to each other) but are still stable when cube faces are close to lying co-linear in the collapsed configuration.

Said cube face (e.g. 16), comprises an outer screen 42, preferably of thin-film or OLED (Organic Light emitted display) construction, with additional screen and device circuitry 41 arranged as a layer behind the screen and utilising the volume 40 for rechargeable battery (e.g. Lithium ion polymer) and larger volume electronics, such as for example modules for inertial gyroscope chips, 30, or wireless connectivity modules 31 or data storage. Said central module chips 30 with additional volume defining the minimum separation between co-planar cube faces 15 and 19 in the collapsed configuration 11, where any remaining gap between collapsed shell faces 6 and 7 is preferably filled by edge plates and shaping (not shown) at the edge of said modules 30.

Also shown is a groove line 45 on the sphere shell 7 that facilitates sphere shell 7 folding upwards over sphere shell 6 in the intermediary partially collapsed configuration and facilitates the fold down of sphere shell ends 6 and 7 in the collapsed configuration 11.

Figure 4A:
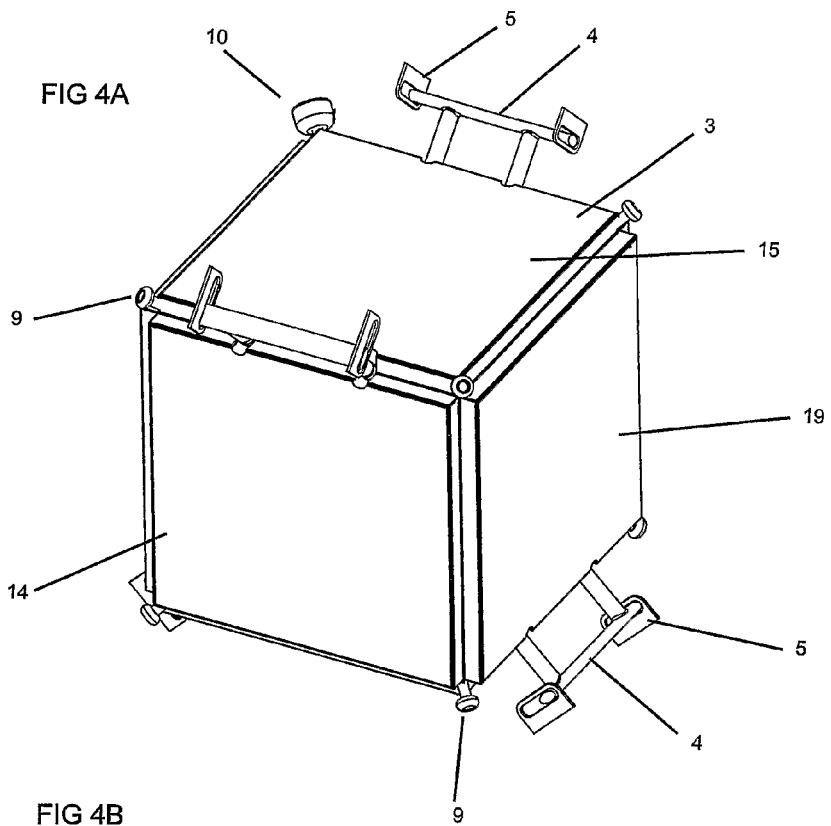
FIG. 4A shows a three dimensional view of the central cube display assembly with the outer spherical surface removed for clarity.
Figure 4B:
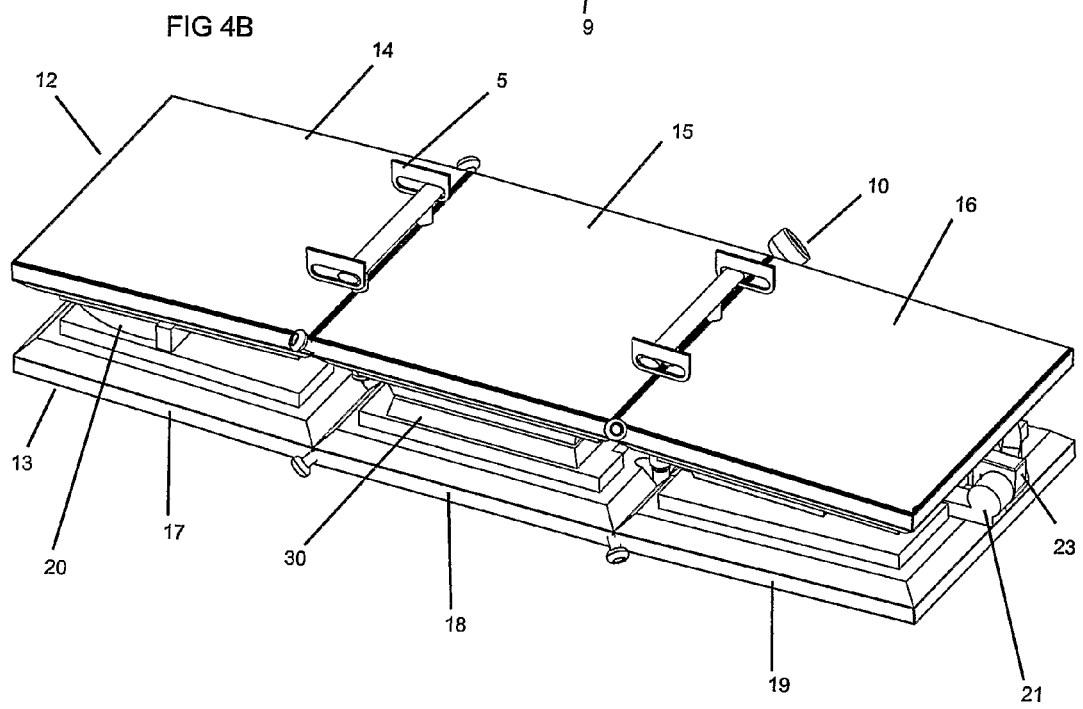
FIG. 4B shows the cube display assembly collapsed in a linear configuration.

Referring now to FIG. 4A which shows a 3-dimensional profile of the central cube assembly with the spherical shell 2 removed for clarity and FIG. 4B which shows this in a collapsed configuration. This diagram more clearly shows the sphere support hinges 4 attached to respective sphere grooves 5, on the central edges of the cube faces 15 an 18 respectively. It also shows corner pegs 9 and a larger socket 10 connected to the central cube faces. Said socket 10 would serve to provide power and data connectivity via preferably a USB2.0 standard, when said overall device 1 or 11 is connected to a docking cradle 84. Said pegs 9 could be used to provide additional sprung support and mechanical control of the sphere shells 6 and 7, and could be used to provide additional external sensors (such as physical buttons, environment sensors or microphones) through or close to the sphere surface or output devices such as speakers, in combination with recesses in the outer sphere shells 6 and 7 as required. FIG. 4B also more clearly shows the separation between cube faces 15 and 18 as limited by the heights of modules 30. A connectivity membrane (not shown) between half cube assemblies 12 and 13 would be achieved via a flexible membrane secured on either assembly. Similarly connectivity between cube faces on an individual assembly would be achieved via a similar membrane joined across the folding axis between inward cube faces. Connectivity between the cube-assemblies and touch sensitive sensors in the sphere would be achieved via a membrane in a similar manner utilizing the proximity of the sphere bar 4 to the central screen circuitry 41.

Figure 5A:
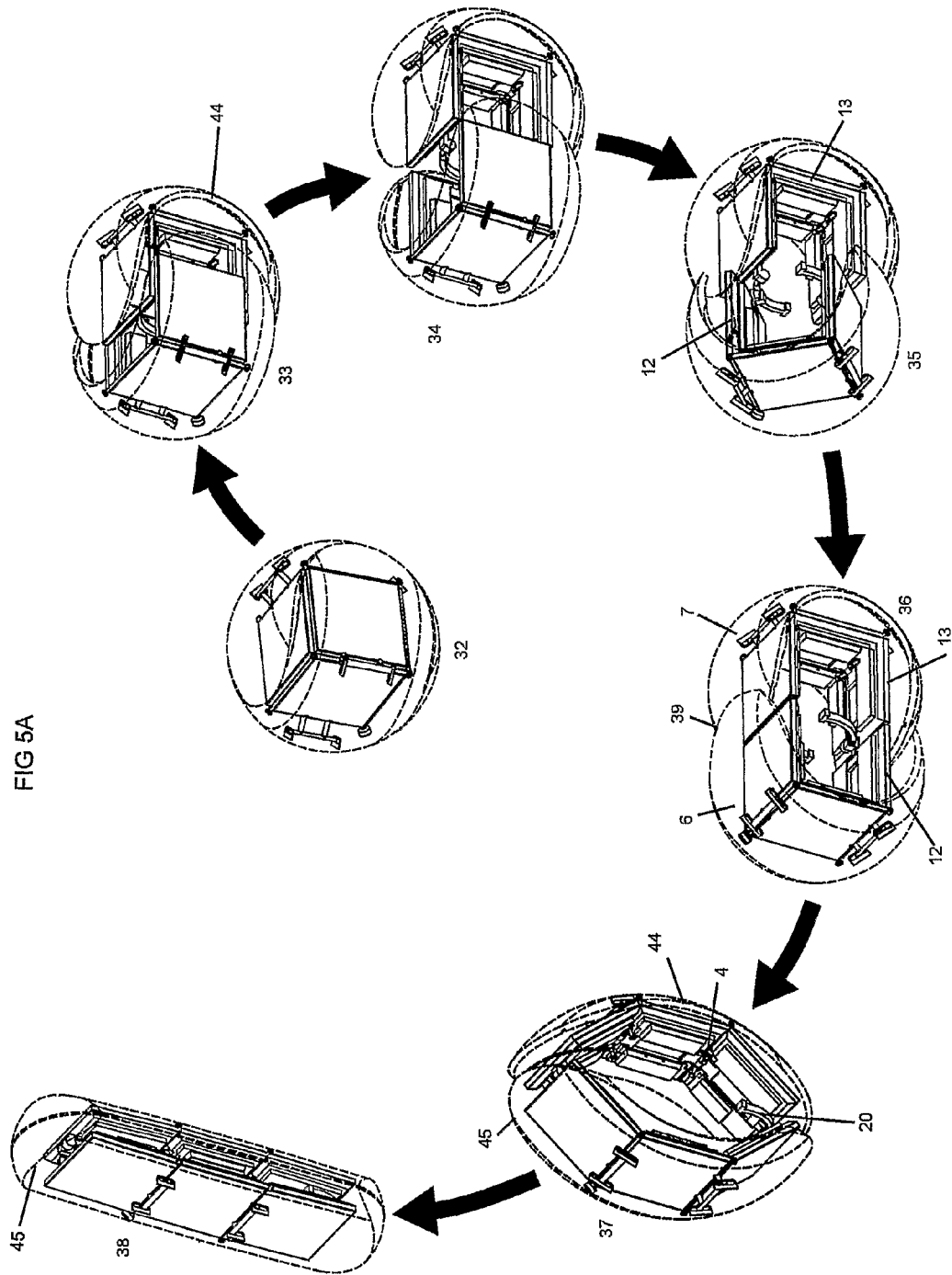
FIG. 5A shows three dimensional views of the overall spherical display and control device at various intermediary stages between the spherical configuration and the collapsed ellipsoid configuration—showing how the device could be pulled apart, rotated, and collapsed.
Figure 5B:
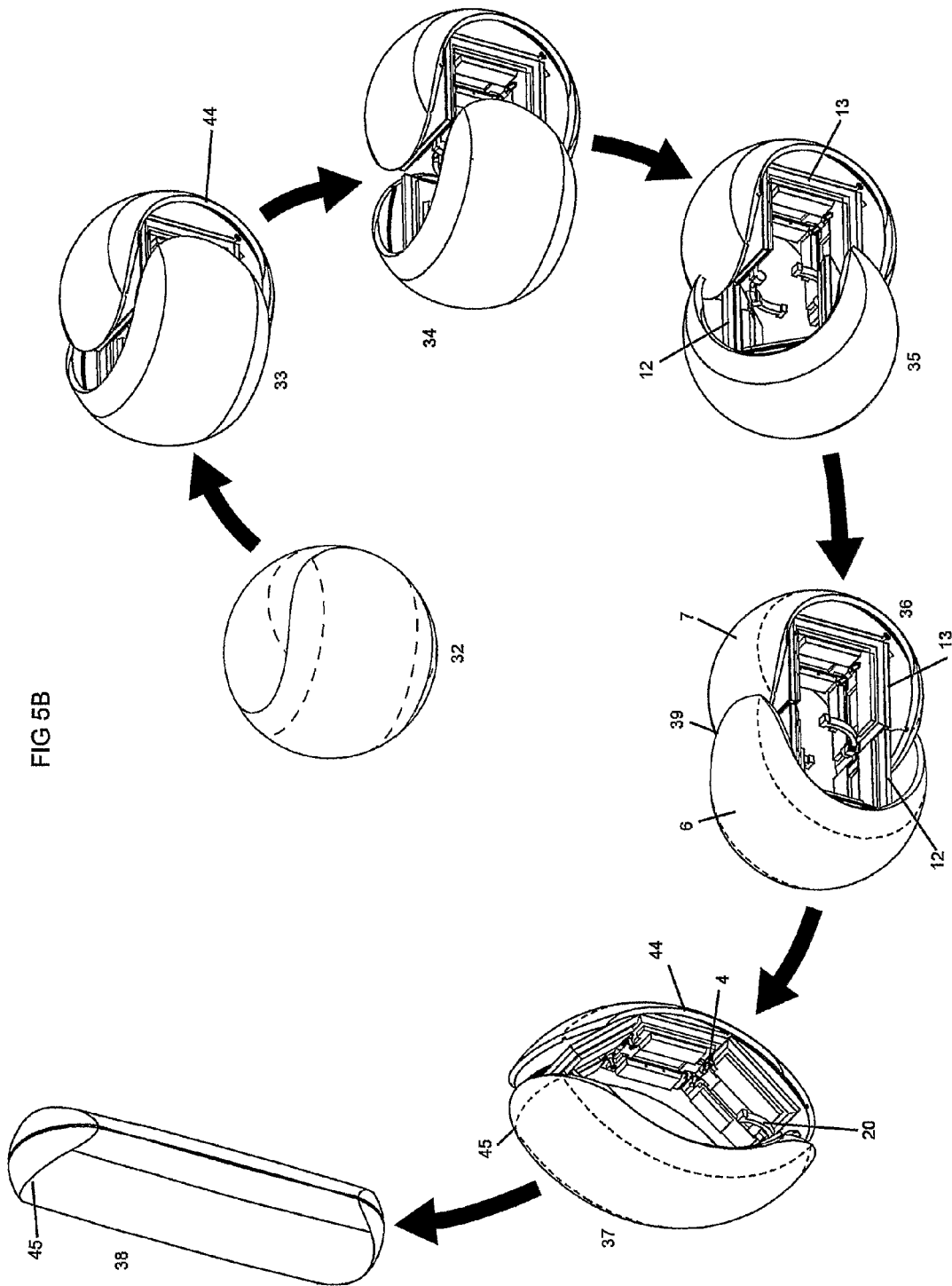
FIG. 5B shows the same sequence with a solid outer surface for clarity.

Referring now to FIG. 5A which shows a 3-dimensional profile of the overall spherical display and control device at intermediary stages between the spherical form 1 and the collapsed form 11. FIG. 5B shows the same stages but with a solid outer shell for clarity. The overall device is biased to be bi-stable between the stable spherical form 1 (stage 32) and stable collapsed form 11 (stage 38). The action of transforming is accomplished by firstly pulling apart the two half-cubes 12 and 13 attached to their respective outer sphere surfaces 6 and 7 in a lateral fashion (via stages 33 until stage 34), secondly twisting the two sphere halves or half-cubes 12,13 through 90 degrees (through stage 35 until 36), and then releasing or pushing together such that the two halves collapse together (stage 37 to 38) part aided by the elastic bias in the outer sphere shells 6 and 7 combined with biasing wires in the sphere support assemblies 4, to form the collapsed device profile 11 (stage 38). Optionally the collapsed profile may be physically maintained and secured by means of a simple locking mechanism (not shown) between the central cube faces 15 and 18. The overall device being biased using internal spring action on the sliding hinges, such that the act of pulling sphere halves apart requires work against springs on the central cube-halve rotary joining hinges 20, 21 and 22,23, but the action of twisting the cubes out of alignment shifts the axis of spring action so that this stage is mechanically neutral—neither preferenced towards open sphere or collapsed, until the cubes are re-aligned at 90 degrees at which point the cube halve assemblies are locked together via their joining hinges 20,21 and 22,23 and can be pushed and collapsed together causing the cube assemblies 12 and 13 to flatten and intrinsic lateral movement of their sliding cube-hinges 24, 27 and 25, 26. Of note is that the central joining hinges 20, 21 (as in FIG. 8) are themselves hinged on their axis and biased to be either flat against the reverse of the cube face or perpendicular to the cube face. Similarly the reverse transformation proceeds by pulling apart the collapsed assemblies 12, 13 until they form their preferred 90 degree point (stage 36), followed by rotation and then releasing so that the sphere halves close together under the spring bias.

Of further note is that the central joining hinges 20, 21 and 22,23 are themselves slidable within the slide rails 43 such that can extend beyond the underside of the cube face edge to provide a folding axis to lie equidistant between the opposing half-cube assemblies, and provide more space for the rotation of the cube halves in stages 34-36. Of particular note is that the leading edge of the sphere shell 6 has an outer groove line 39 above internal groove 45 which facilitates the overlap folding of shell 6 over shell 7 during the transition between stages 35 and 36.

FIG. 5B similarly shows the overall transformation between spherical form 1 and collapsed form 11, through the pull out stage 33,34, twist stage 35,36 and collapse/release stage 37,38. The overall action being symmetrical and mechanically biased such that spherical form 1, stage 32 and collapsed form 11, stage 38 are fully stable with stage 35 (the mid-way rotation point) being semi-stable.

Referring now to FIG. 6 which shows a detailed cross-section through the sphere form of the product, and more clearly shows the cube section 15 being composed of layers 42—for outer screen, 41 for circuitry, 40 for rechargeable battery layer—such as a Lithium ion polymer/LiB, and large chip modules 30, suitable for solid state gyroscope or inertial sensors, advanced MEMS chips, data storage. FIG. 6 also shows a section through the sphere surface that comprises an outer protective surface coating layer and inner layer 48 that preferably contains a transparent capacitive sensing multi-point technology, generally formed from transparent sense wire conductors formed by say an indium tin oxide (ITO) layer formed over a polyester (PET) or polycarbonate layer sandwiched between suitable adhesives and connected at their edges via similarly transparent conductors to a wire membrane 47 within the sphere support bar 4. Said multi-point sensor layers work in planes for each axis detection, and would preferably form a main axis along the length of the sphere shell 6, 7 sections connected directly to the central cube face 15 circuitry via the sphere support bars 4 and membrane 47, and form a vertical axis perpendicular, across the width of the sphere shell section. The effect of said layers is to measure surface position through changes in capacitance caused by the proximity and movement of a nearby finger. The overall software being configured to measure instances of differential capacitance caused by say direct thumb movement or selection, and to distinguish and resolve this against slower changes in capacitance arising from the imprint formed from other fingers holding the device in the palm of a hand.

Referring now to FIG. 7 which shows an enlarged section of the reverse of a cube face 14 (or 18) that supports chips 30 on battery layer 40, circuit layer 41 and outward screen surface 42 (preferably of thin-film or OLED—Organic Light Emitting Display form). Of particular note is the recessed cylindrical grooves 53 and 54 shaped to position the sphere support bar assembly 4 in the spherical 1 and collapsed 11 configurations, Connected cube faces 13, 15 or 17, 19 have a similar structure except for a reduced volume 31 for additional chips 30. The cube face reverse has a central groove containing edge rails 43 that encase and secure the sliding hinges, be they sliding cube-hinges 24, 27 and 25, 26 or central joining hinges 20, 21 and 22,23. Towards the centre are vertical pins 55 which constrain a control wire 57 fixed to the vertical supports 73 and axel 75 on the sprung sphere support bar assembly 4 around a similar pin 56 in the slidable hinge 25. This acts as a double pulley system such that the natural action of sliding the hinge 25, during collapse, towards the corner axis, say one unit, increases the length of said wire 57 (between pegs 55) by two units and acts to pull the sphere support bar 4 downwards, compressing the spring 78, and thereby pulling the sphere shell 6 towards the cube faces as the cube assembly is flattened towards the collapsed configuration 11. Similarly the reverse action where the hinge 25 is biased towards the centre of the cube face via mechanical springs, shortens the wire 57 (between the pins 55) releasing the sphere shell 6 to expand upwards under the action of the spring 78. Also shown are corner pegs 9 shown in this illustration as pegs 50, 51, 52 corresponding, by way of example to a microphone 50, speaker unit 51 and LED indicator 52, each being connected directly to the circuitry 41. Corner Peg 10 corresponds to a connector socket that supports USB connectivity, involving four connectors to support data linkage and power contact for recharging, and could optionally have a larger physical mass and vertical sensor to help orientate the device on a surface or when placed in a docking cradle.

FIG. 7 also shows the front surface of the cube-display where the thin-film display and polarizer supports a lens 49 attached to the outward face of the cube display 42. Said lens 49 could be shaped to act as a spherical convex lens, or be constructed as a flat fresnel lens to alter the optics such that the cube face display is viewed from the outer sphere either as a cuboid display or as a spheroid display. Similarly said lens could be formed as part of the under-side of the sphere surface shells 6 and 7, using a similar flexible lens material as deployed in eye 'contact lenses' or by using a fresnel lens layer moulded into the transparent underside of the sphere surface. Optionally the thin-film flat cube display 42 could be replaced with a flexible display surface on the inside of the sphere shells 6 and 7 (such as emergent bi-directional flexible OLED displays, or transparent liquid crystal polymers with separate light source), and connected by membrane by means of the sphere support bar 4, with the remaining volume on the surface of the cube display 42 used to support additional circuitry and modules. Optionally a polarizer layer could be included in the outer flexible sphere shells 6 and 7, so as to help control viewing angle in the spherical and collapsed configurations.

Referring now to FIG. 8 which shows a rotary stages view of the central joining hinges 20, 21 and 22,23 at no rotation (stage 65) as it would appear when the overall device is in its spherical form 1, half rotation (stage 66) and full 90 degree rotation (Stage 67), and then in partial fold (Stage 68A) and full fold (Stage 68B) as it would appear when the overall device is in the collapsed form 11. The mechanism consists of a primary joining hinge 22, 23 slidable within one half-cube assembly 12 that contains a hole 72 shaped to slide over the large curved ring on secondary 'rotary' hinges 20,21, within the other half-cube assembly 13, until the half-cube assemblies are rotated and symmetrically aligned (stage 36, 67), at which point the joining 22 and rotary hinges 20 are co-planar, with joining hinge 22 then free to rotate about the shaped cylindrical section 69 on the curved rotary ring 20, and the curved rotary ring 20 is free to spring collapse about its spindle and fold axis 70. The overall mechanism therefore provides an example of a slideable off-axis rotary joining hinge that serves to maintain physical connection between the two half cubes 12 and 13, at all times, and to control the transition between overall forms 1 and 11, through an extend, rotate and collapse. Similarly this complex mechanism could be achieved by using a combination of interlocking half-discs or flexible rings.

Referring now to FIG. 9A and FIG. 9B which shows the sphere support bar assembly 4, that connects the outer transparent sphere shells 6 and 7 to the central cube assembly 3 at the corners of the central cube faces 15 and 18. The support bar 4 is preferably transparent and slides within opposing transparent or thin metal grooves 5 in the sphere shells 6, 7 and is connected to vertical cylinders 73 at either end that pass through horizontal hinge bars 75 or 76 which forms the axel of the corner hinges 24, 27 and 25, 26. Said vertical cylinders having a spring 78, and end stop 74 and being connected to a control wire 57 see FIG. 7 that passes through a hole at the end of the axels 75 and 76, such that the act of pulling the wire (achieved via the pulley mechanism described on FIG. 7) serves to help compress the spring 78 and transition the sphere bar assembly 4 from maximum extension to maximum compression. Said axels 75 and 76 are shown in this illustration to be of different length, such that they could overlap in the fully collapsed configuration 11. FIG. 9C shows how said support bar assembly 4 would appear in the overall sphere device 1 where the central cube assembly 3 is in its cubic form, with the support bar support cylinders 78, passing through grooved recessed 53 and 54 on the edges of the cube faces and passing through the cube hinge axel at 45 degrees. In this position the sphere bar assembly 4 is at far end of the sphere grooves 5 relative to the central cube face 15. When the outer shell 6 is un-curved and flattened against the cube faces in the collapsed configuration 11, as shown in FIG. 9D, the support bar assembly 4 folds through 45 degrees and slides to the opposite far end of the sphere grooves 5 as the overall shell 6 extends. In this position the support cylinders 78 are at maximum compression and lie perpendicular to the hinges 24,27 which have extended to provide a folding axis that lies directly beneath the edges of the cube displays 42. Said overall sphere support mechanism 4 therefore provides a mechanism of securing the outer sphere shells, and controlling their extension and collapse towards the cube faces in the collapsed configuration. The springs 78, also provide some cushioning of the central cube assembly 3 when the overall device 1 is in a spherical configuration, against external knocks on the sphere. Optionally the corner pegs 9 could provide additional support for the sphere and transition at the edges.

Further Embodiments

Referring now to FIG. 10 which shows an alternative embodiment where the outer shells 6,7 are replaced with a solid transparent section 58 affixed directly to each of the cube faces forming the central cube assembly 3. Said solid section 58, has a 45 degree edge on each side, such that it enables the overall cube half assemblies 60, 61 to slide apart as before. Said solid assembly can collapse in a similar manner, except that the fold axis between cube faces on each cube half assembly now needs to lie directly under the outer surface of the sphere in the collapsed configuration and requires the cube faces 42 to be slightly separated. This would be achieved in the same manner by using slightly longer sliding hinges 24, 25, 26, 27 to provide the off-axis fold line. Each set of three solid transparent sphere sections 58, would preferably be connected on their outer surface by a thin-flexible layer. The edges of these sections 58 could optionally be hinge-able to form a folding section 62 at each end at the sides 63, via a similar flexible layer on their lower surface, such that folding through 180 degrees enables the sphere edges to fold to become flush with the 45 degree edges of the reverse of the cube displays, thus providing a flat edge 59 at the ends similarly at the sides of the overall device in the collapsed configuration, helping to create a similar small collapsed profile. Additional folding panels (not shown) attached directly to the interior of the cube assembly could optionally help seal the unit in the collapsed configuration.

Figure 11:
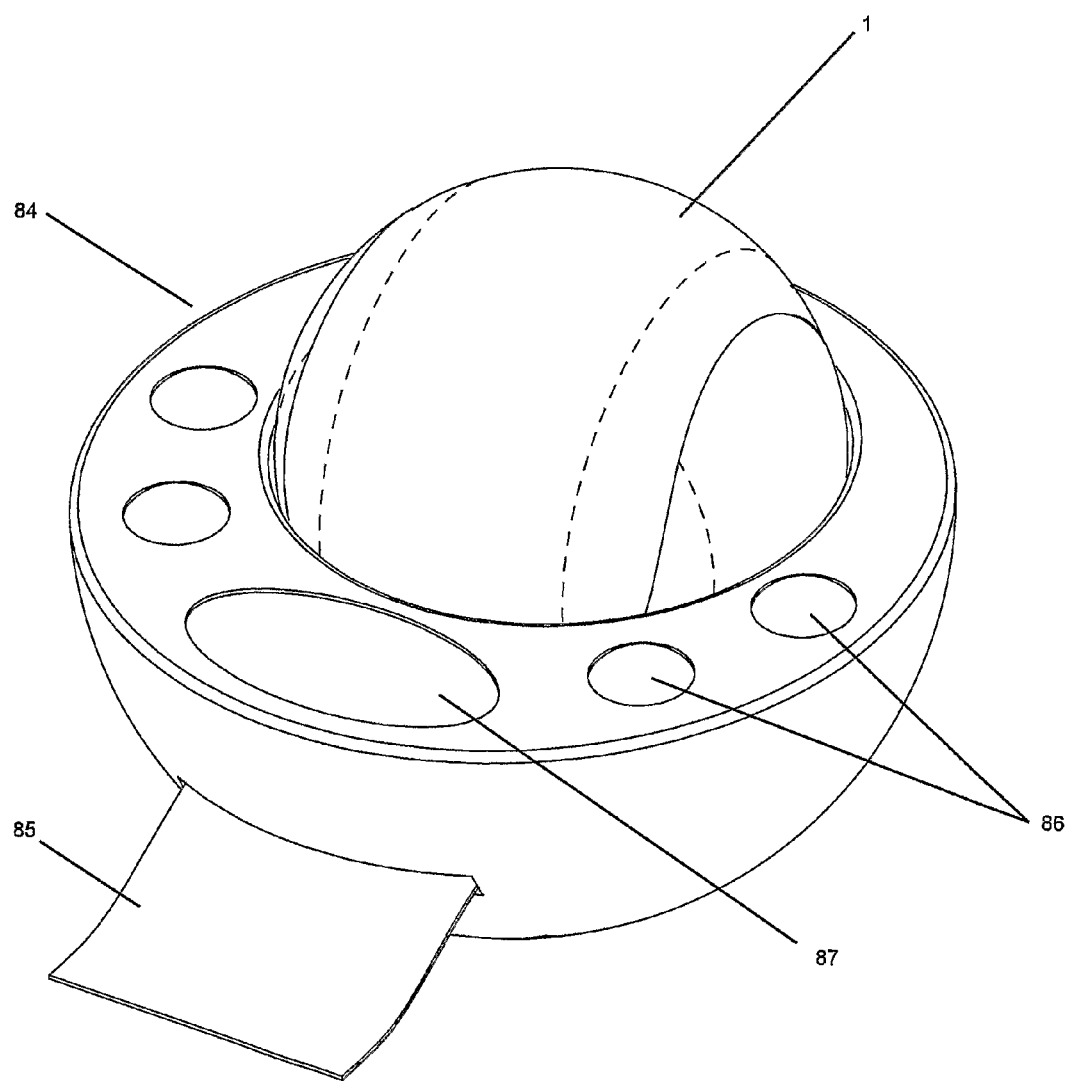
FIG. 11 shows a three dimensional view of a docking cradle with ticker-tape printer for holding the spherical display and control device for recharging, fixed point use and additional connectivity.

Referring now to FIG. 11 which shows an example docking cradle 84 for fixed connectivity for the overall spherical display and control device 1. Such a device could be connected directly to a workstation, or used as a home-docking port, and would preferably contain external connectivity for power, data and other expansion sockets, and support a wireless contact to provide one source of link to the overall sphere device when used nearby. Said device preferably contains a small printer 85—which uses a small paper real and short line printer suitable for printing short messages/lists, and would preferably be accessible wirelessly by clicking on the sphere device, and could optionally contain an additional touch screen X/Y surface 87 and fast path buttons 86 for selection purposes. Said device 84 would preferably use a USB standard and have either a socket or vertical prong or hole to connect physically to the equivalent socket 10 on the overall device 1. Optionally power re-charging could perhaps be achievable without a fixed socket via magnetic induction using a combination of part transformer in the cradle 84 aligned with a similar device in close proximity in the cube assembly. Potentially as power requirements for display and module electronics reduce, this could perhaps be achievable by using an oscillating ultrasound signal in the cradle tuned to resonate piezoelectric vibrators held in an induction loop within the cube assembly.

Figure 12:
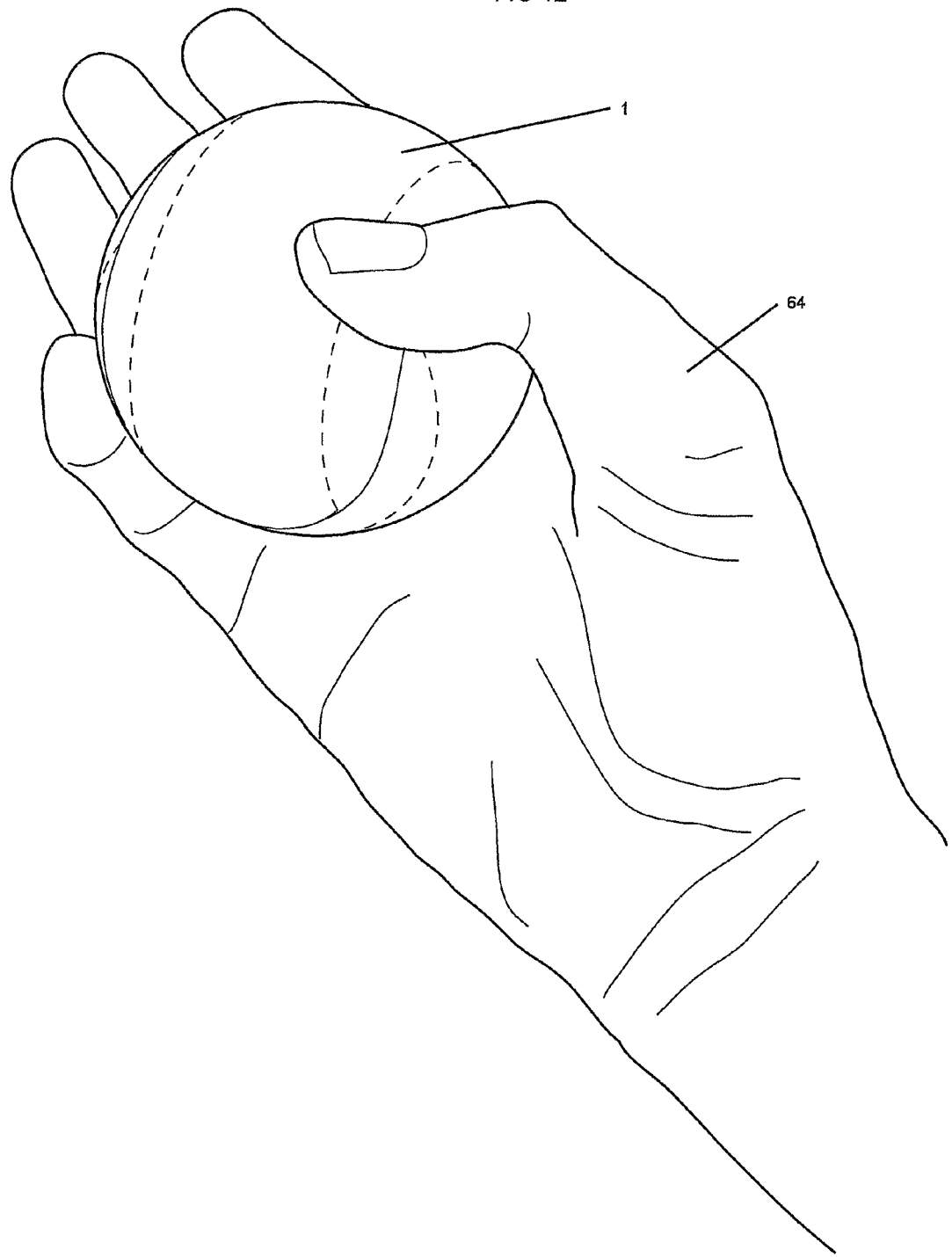
FIG. 12 shows an illustrative three dimensional view of a hand-sized spherical display and control device being used in the palm of a hand, with thumb being used to slide over the surface.

Referring now to FIG. 12 which shows a hand sized overall spherical display and control device 1 how it might appear and be used in a hand 64 where a thumb or forefinger is used to slide over the touch-screen for control purposes and the device could easily be rotated to provide rotation data, or moved laterally. Similarly the device could be held in the collapsed configuration and used vertically like a remote or horizontally across the palm.

Figure 13:
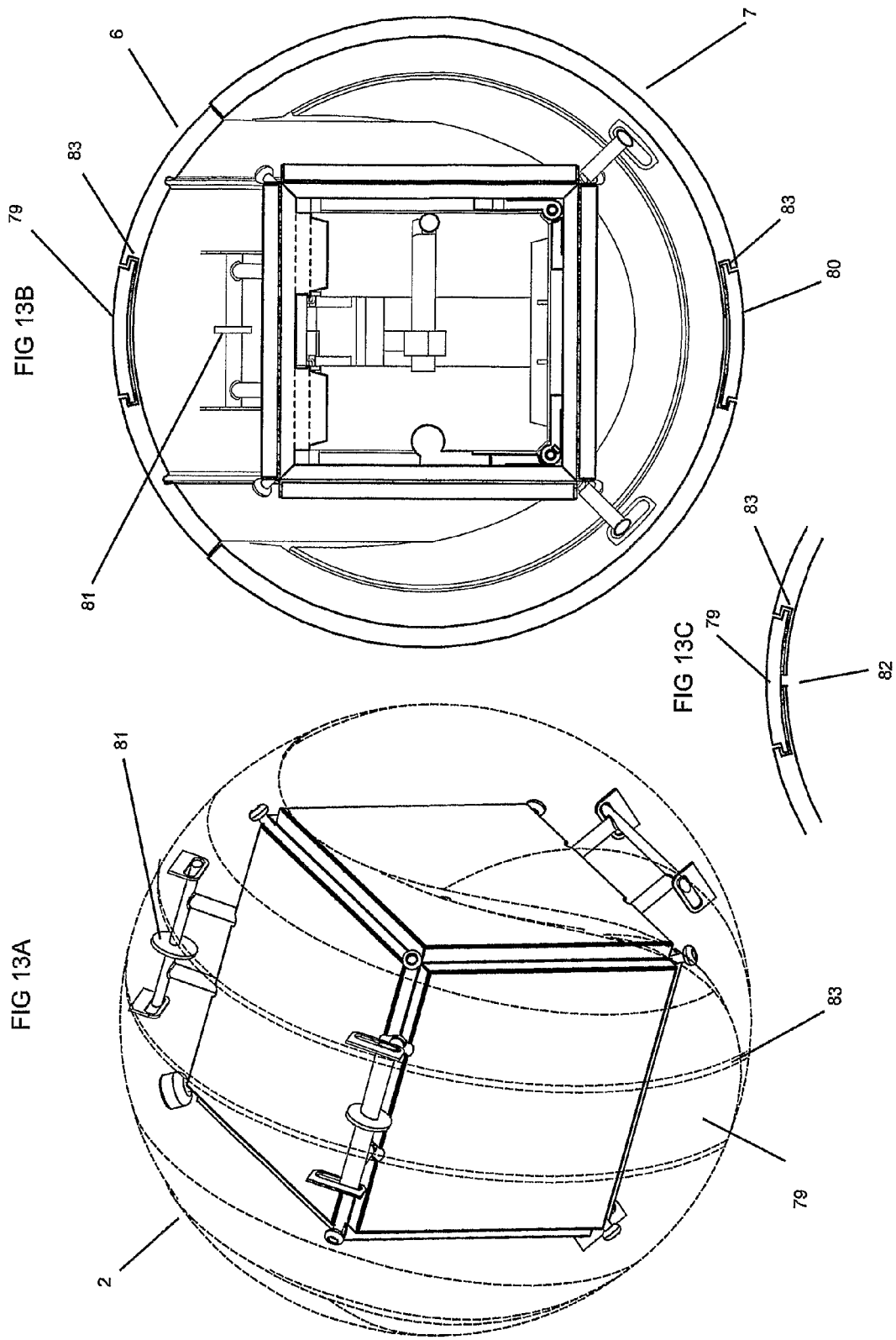
FIG. 13 shows a three dimensional view of a further embodiment of the overall spherical display and control device where the outer sphere surface contains a mechanically rotate-able control wheel

Referring now to FIGS. 13A and 13B which shows an alternative embodiment where a mechanical mouse wheel 79 is used on the outer sphere surface 2 to provide rotation/selection information, Said wheel being preferably formed with a cross-section as illustrated in FIG. 13C passing through a similar grooved cross-section 83 in the outer sphere surface 2 and being formed from a flexible material that would have reduced elasticity (compared to the outer sphere surface) by virtue of being thinner and could preferably be attached on its underside to a smooth thin plastic membrane to reduce friction as the wheel is rotated around the sphere. Said mouse wheel 79 rolling on rubber discs 81 affixed to the sphere bar assembly 4, and passing through a slot 82 on the underside of the sphere shell 6, to measure rotation data, and preferably in combination with the sphere bar assembly springs 78 to identify a selection action through compression or changes of resistance on the control wire 57 between pegs 55. Said overall mouse wheel passing through a central groove 83 running lateral to the sphere shell 6 and through a similar groove running perpendicular to the sphere shell 7 at the central point. The overall mouse wheel therefore being formed from a long 'C' section 79 and shorter joining section ')' 80 to complete the wheel, said overall wheel locking or preventing the overall sphere device from being pulled apart until they are rotated and positioned with the short section 80 directly aligned over sphere shell 7.

Figure 14:
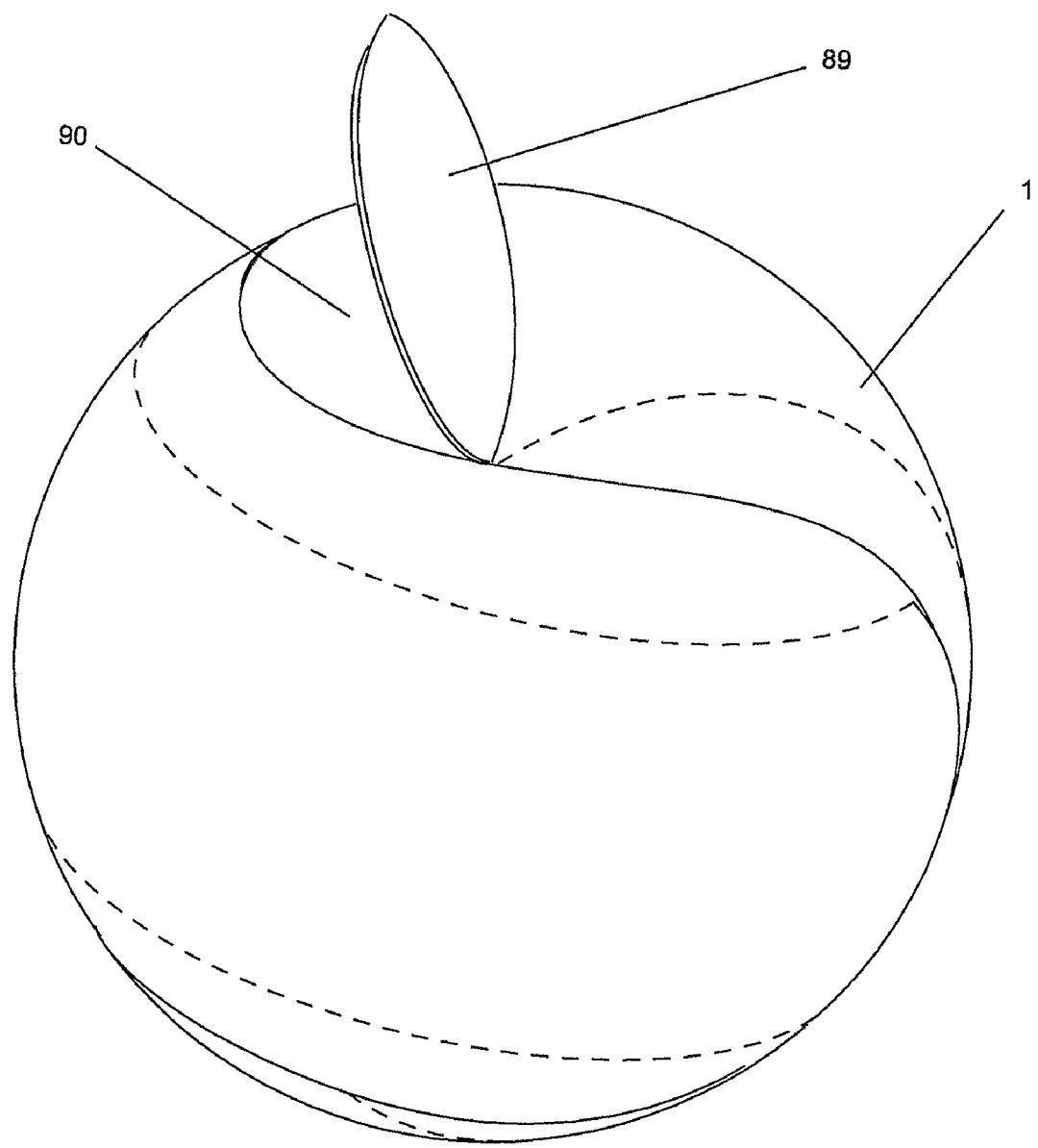
FIG. 14 shows a three dimensional view of the overall spherical display and control device where a section of the outer surface folds and reveals a sprung connector socket

Referring now to FIG. 14 which shows an alternative embodiment where the outer shell 2 comprised of a sphere shell sections 6 and 7, has an end section 89 that can hinge or fold up to provide greater access 90 to a charging socket 10, or to additional connectors/expansion slots on the cube assembly. Such an embodiment could be combined with an LED on peg 9 on the adjacent side, such that the overall device provides a stylised ornamental 'apple' representation.

Although the invention is mainly described and illustrated with reference to a preferred embodiment with flexible outer sphere shell and central cube displays, example collapse mechanism, and sensor technology it is expressly understood that it is in no way limited to the disclosure of such preferred embodiments, but is capable of numerous modifications within the scope of the claims. By way of example the sphere shell could include a flexible OLED display layer leaving the central cube predominantly to manage the mechanical collapse mechanism and to support additional circuitry and module components. Furthermore the example rotary central hinge mechanism, and the sphere support assembly mechanisms could be implemented in an alternative mechanical manner. Similarly the display and control device could be implemented simply as a solid-state sphere without the collapse mechanism.

What is claimed is:

1. A spherical display and control device comprising:
   a transparent flexible outer shell containing transparent internal layers for surface touch-screen sensing;
   a central assembly that mechanically supports said outer shell in a spherical configuration;
   said central assembly supporting electrical components that provide motion and rotation sensors suitable for control and data input purposes;
   said central assembly containing one or more electrical components for acting to provide one or more of battery power, display and control circuitry, connectivity, data storage and sound input and output; and
   at least one display electrically connected to said central assembly, the display being arranged as at least one of a flat panel and a flexible thin film display, the display being supported by least one of the central assembly and the outer shell.

2. A spherical display and control device according to claim 1 that is collapsible between a spherical configuration and a collapsed generally cylindrical ellipsoid configuration via a controlled mechanical collapse action of the central assembly, where said central assembly supports said flexible outer shell in the spherical configuration and in the collapsed configuration, and said outer flexible shell is formed from two interlocking curved shells.

3. A spherical display and control device according to claim 1, wherein said central assembly is of a modular form and having a plurality of faces in a polyhedral arrangement that are mechanically and electrically connected.

4. A spherical display and control device according to claim 3, wherein said modular central assembly is arranged as a mechanically hinged cube comprised of two interlocking and mechanically connected cube halves, where each cube half supports an outer flexible curved shell and is formed from three modular cube faces that are mechanically connected such as to be collapsible between a cube arrangement—where said faces are perpendicular and a generally flat arrangement of said cube faces.

5. A spherical display and control device according to claim 4, wherein said modular cube faces are formed from layers comprising at least one of a display panel, circuitry, battery layer, and shaping on an inward layer that forms a central grooved recess to accommodate a sprung sliding cube hinge that when slid outwards can provide an off-edge folding axis between the cube faces.

6. A spherical display and control device according to claim 4, wherein said mechanical connection between cube halves is achieved through a central assembly comprising joining hinges and rotary hinges where said joining and rotary hinges can both slide within the recessed grooves on the reverse of cube faces on adjacent cube-halves, and together provide an off-edge folding axis between cube halves such that the interlocking cube-halves can be pulled fully apart enabling said cube-halves to then be rotated relative to each other.

7. A spherical display and control device according to claim 6, wherein said rotation of the cube-halves is achieved through a rotary hinge mechanism that comprises a hole on the joining hinge shaped to slide over a quarter ring or rail forming the rotary hinge, where said ring is tapered and has a spindle and smaller diameter at one end corresponding to when the slid joining and rotary hinges become coincident and coplanar at the point the half cubes are rotated to the 90 degree point, where said spindle and tapered edge together then form a new folding hinge axes enabling the joining and rotary hinges to fold together such that the overall cube-halves fold together back-to-back and become generally flat.

8. A spherical display and control device according to claim 4, wherein the overall device is bi-stable, having a stable form in the spherical and collapsed configurations and having a semi-stable form at the intermediate semi-rotated position, with mechanical springs within the central assembly and the elastic forming of the outer shells biasing the device to either form, such that the overall collapse action takes place by pulling the two sphere shell and half cube assemblies apart, rotating the cubes through 90 degrees and then pushing the half cubes together and releasing the two half cube assemblies so that they collapse together, with a similar reverse action to un-collapse the device.

9. A spherical display and control device according to claim 4, wherein said central assembly mechanically supports said outer shells via a support bar assembly that helps spring support the outer sphere shells in a spherical configuration providing dampening against knocks and controls and biases the outer shells to fold towards the cube feces during the overall device collapse from the spherical to the collapsed configuration.

10. A spherical display and control device according to claim 6, wherein said support bar assembly comprises a bar sliding within grooves on the shells, sprung supports attached to axles on the central cube hinge mechanism, and biasing by at least one wire attached to the reverse of the cube face, such that the act of collapsing the cube assembly helps rotate and compress the support bar assembly and positions the outer sphere shell to stretch and lie generally planar to the collapsed cube faces.

11. A spherical display and control device according to claim 4, wherein said outer shells fold into an open or collapsed form and generally join together in their respective spherical and collapsed configurations aided by magnetic means along the shell edges, folding grooves along the underside of the shells, and via the position of the outer corner pegs on the cube faces.

12. A spherical display and control device according to claim 4, wherein said outer shells are flexible and formed to preference a specific curved profile, through elasticity from their initial moulded position and having integral fibres of different tensile and compressive strengths.

13. A spherical display and control device according to claim 4, wherein polarizers and fresnel or curved lenses are mechanically supported by or attached to the face of said modular cube faces creating an overall spherical display on the outer surface in the spherical configuration and a generally linear ellipsoid display across the outer shells in the collapsed configuration, where said lenses may slide and reposition during the collapse for purposes of focus.

14. A spherical display and control device according to claim 1, wherein a flexible thin-film display is formed across the inside surface of the outer shell and connected to the central assembly such that this forms a spherical display in the spherical configuration and a generally linear ellipsoid display in the collapsed configuration.

15. A spherical display and control device according to claim 14, wherein said flexible thin-film display is formed from a flexible film supporting an Organic Light Emitting Display and a flexible thin-film transistor substrate layer.

16. A spherical display and control device according to claim 14, wherein software is used to control an overall composite surface image formed from said plurality of displays in either the spherical or collapsed ellipsoid configuration and to provide for rapid changes in the display in response to position and sensing data from the control layers and sensors, and via wireless data connectivity with another device.

17. A spherical display and control device according to claim 1, wherein said touch-screen sensing is provided by a transparent capacitive sensing technology that uses several transparent conductive layers of sensors to identify changes in the capacitive field around the surface of the device and performs multi-point sensing.

18. A spherical display and control device according to claim 17, wherein said multi-point sensing layers are segmented into at least two regions and said device uses software to identify and resolve slow-moving changes relating to overall holding of the device against fast-moving changes arising from finger movement and selection.

19. A spherical display and control device according to claim 17, wherein said sensing technology provides data to control applications on a nearby device or dynamically change the spherical display of the device or enable individual selections of areas and content displayed on the device.

20. A spherical display and control device according to claim 1, wherein said motion and rotation sensors are acceleration and gyroscopic sensors that provide 6 degree change information, 3 for rotational information and 3 for lateral movement, such that this control data can be used to dynamically move or rotate the display on the surface of the device or provide selection and rotation and movement data to a nearby application.

21. A spherical display and control device according to claim 20, wherein said gyroscopic and acceleration sensors are piezoelectric vibrating resonators arranged in an orthogonal pattern within the central cube assembly and provide control data in both the spherical and collapsed configuration.

22. A spherical display and control device according to claim 4, wherein the inner edges of the cube faces forming the cube assembly are shaped to be 45 degrees and allow for tight external corners of the cube in the spherical configuration and to provide an abutting slide edge for the overall cube half assemblies to slide relative to each other.

23. A spherical display and control device according to claim 4, wherein pegs are positioned at the corners of the cube assembly to further support and control the sphere during collapse and to provide additional electronic components such as microphone, speakers and sensors.

24. A spherical display and control device according to claim 21 wherein ere at least one of said pegs provides a socket suitable for connecting the device externally using a USB standard (Universal Serial Bus) for power recharging and connectivity.

25. A spherical display and control device according to claim 1, wherein said one or more electrical components include batteries that are rechargeable and are lithium ion polymer batteries formed in layers.

26. A spherical display and control device according to claim 4, wherein flexible electrical membranes within the central cube assembly connect adjacent cube feces and connect cube half assemblies, and connect to the display and sensor layer in the outer surface.

27. A spherical display and control device according to claim 26, wherein said flexible electrical membranes connect to the outer shells via the support bar assemblies and are semi-transparent.

28. A spherical display and control device according to claim 1 combined with an external docking cradle that contains wireless and data connectivity and that can be used for recharging, where said cradle optionally supports a small printer suitable for short messages and lists, and further supports an X/Y touchpad sensor.

29. A spherical display and control device according to claim 1, wherein said outer shell contains a 'petal shaped' end section that hinges and folds up to provide greater access to a socket, and stylised such that when open the overall device has a apple representation of ornamental form.

30. A spherical display and control device according to claim 29, wherein said socket has a larger physical mass and vertical alignment sensor to help physically bias the orientation of the device in isolation or to provide vertical orientation data so that the software can re-orientate the display surface.

31. A spherical display and control device according to claim 1 without an outer shell and sphere support assembly such that it provides a stand-alone cube display which can be collapsed to create a linear display.

32. A spherical display and control device according to claim 2 combined with a flexible circular control wheel passing through a shaped groove recess in the outer shells and rolling over a sensor wheel attached to the support bar assemblies, where said control wheel is formed from one long section corresponding to a lengthways groove on one sphere shell and a short section corresponding to a perpendicular groove on the second sphere shell.

33. A spherical display and control device according to claim 4, wherein said outer shell is formed as a solid shell affixed directly to the cube faces of the central cube assembly, with grooved edges that can fold in the collapsed configuration to form generally flat edges.

34. Use of a spherical display and control device according to claim 1, as one or more of the following:
   I. as a 2D and 3D control device with applications on a nearby device, with said surface display showing a surface representation of context, an overall navigation map, or with visual areas showing customised controls, and said overall device being usable in spherical or collapsed configurations in a hand, on a surface or in a cradle;
   II. as an interactive spherical display for information access and selection purposes, information navigation and fast access to links, or dashboard showing status information;
   III. wirelessly in a group-environment providing dynamic team and project status, two-way communication, data sharing and interactive control of applications;
   IV. as a personal organizer and access device for viewing and selecting information, communicating with third parties and groups, and rapid viewing of status and alerts;
   V. as a customisable remote control with said outer display including customisable visual menus to control third party appliances;
   VI. for interactive games or to control games on nearby devices, where said outer display shows interactive 3D surfaces with information and patterns that respond to physical surface touching or physical rotation and movement of the device and generally provides for a range of game design and game-play; and
   VII. in combination with software and display area on a nearby device that provides an icon and dynamic representation of the current sphere surface display and can be used independently in a similar manner as an interactive control ball for purposes of data access, navigation, status viewing and communicating.

35. A computing system comprising a computer, a display and a control device for control of the computer, the control device being a spherical display and control device according to claim 1.

36. A method of controlling a computing system, comprising using a control device according to claim 1.

37. A spherical display and control device comprising:
   a transparent flexible generally spherical outer shell containing largely transparent internal layers used for surface touch-screen sensing;
   a modular central assembly that mechanically supports said outer shell in a spherical configuration and having a plurality of faces in a polyhedral arrangement that are mechanically and electrically connected;
   said central assembly supporting electrical components that provide gyroscopic and acceleration sensors suitable for control and data input purposes;
   said central assembly containing a plurality of electrical components that can act to provide battery power, display and control circuitry, connectivity, data storage and sound input and output; and
   a plurality of thin displays electrically connected to said plurality of faces forming the central assembly arranged as flat panels supported by said faces or as a flexible thin-film displays attached to the sphere shell.

38. A collapsible spherical display and control device that is collapsible between a spherical configuration and a collapsed generally cylindrical ellipsoid configuration comprising:
   a transparent flexible generally spherical outer shell containing largely transparent internal layers used for surface touch-screen sensing and formed from two interlocking curved shells;
   a modular central assembly that mechanically supports said outer shell in a spherical configuration and having a plurality of faces in a cube arrangement that are mechanically and electrically connected;
   said central assembly supporting electrical components that provide gyroscopic and acceleration sensors suitable for control and data input purposes;

said central assembly containing a plurality of electrical components that can act to provide battery power, display and control circuitry, connectivity, data storage and sound input and output;

a plurality of thin displays electrically connected to said plurality of faces forming the central assembly arranged as flat panels supported by said faces or as a flexible thin-film displays attached to the sphere shell; and where said central cube assembly has a sliding central joining and rotary hinge mechanism and shell support mechanism that helps control the mechanical collapse action of the overall device.

* * * * *